US008947581B2

(12) United States Patent
Hamada et al.

(10) Patent No.: US 8,947,581 B2
(45) Date of Patent: *Feb. 3, 2015

(54) FOCUSING APPARATUS THAT EFFECTIVELY SETS A FOCUS AREA OF AN IMAGE WHEN A FOCUSING MODE IS CHANGED

(71) Applicant: Samsung Electronics Co., Ltd., Suwon-si, Gyeonggi-do (KR)

(72) Inventors: Masataka Hamada, Suwon-si (KR); Kenji Ishibashi, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/242,284

(22) Filed: Apr. 1, 2014

(65) Prior Publication Data
US 2014/0211066 A1 Jul. 31, 2014

Related U.S. Application Data

(63) Continuation of application No. 13/196,159, filed on Aug. 2, 2011, now Pat. No. 8,711,273.

(30) Foreign Application Priority Data

Sep. 8, 2010 (KR) .................. 10-2010-0088055

(51) Int. Cl.
H04N 5/232 (2006.01)
G03B 13/00 (2006.01)
G02B 7/10 (2006.01)
G02B 7/28 (2006.01)
G03B 13/16 (2006.01)
G03B 17/14 (2006.01)
H04N 5/222 (2006.01)

(52) U.S. Cl.
CPC ............ H04N 5/23293 (2013.01); G02B 7/102 (2013.01); G02B 7/282 (2013.01); G03B 13/16 (2013.01); G03B 17/14 (2013.01); H04N 5/23212 (2013.01)
USPC ...................................... 348/346; 348/333.02

(58) Field of Classification Search
USPC .................. 348/345–347, 333.01–333.03
See application file for complete search history.

(56) References Cited

U.S. PATENT DOCUMENTS 6,476,868 B1 11/2002 Kaji et al.
7,433,586 B2 10/2008 Onozawa
(Continued)

FOREIGN PATENT DOCUMENTS

JP 2007-279677 A 10/2007

Primary Examiner — Kelly L Jerabek
(74) Attorney, Agent, or Firm — Drinker Biddle & Reath LLP

(57) ABSTRACT

A focusing apparatus includes a focus area setting unit that sets a first focus area in a first captured image, an auto focusing control unit that performs focusing according to a first focus evaluation value that is calculated from the first focus area by automatically adjusting a focus lens, an information deriving unit that derives focus aid information corresponding to a second focus evaluation value that is calculated from a second focus area in a second captured image by manually adjusting the focus lens, and a storage unit that stores at least one of first focus area information about the first focus area and second focus area information about the second focus area, wherein the focus area setting unit sets a third focus area in a third captured image from among the first focus area information and the second focus area information stored during another focusing.

18 Claims, 27 Drawing Sheets

(56) References Cited

U.S. PATENT DOCUMENTS

| | | |
|---|---|---|
| 7,486,330 B2 | 2/2009 | Sawachi |
| 8,373,790 B2 | 2/2013 | Suto |
| 2006/0012702 A1 | 1/2006 | Kawahara et al. |
| 2009/0102960 A1 | 4/2009 | Tsuchiya |
| 2009/0115883 A1 | 5/2009 | Tsuchiya |
| 2009/0237550 A1 | 9/2009 | Tsuchiya |

POSITION OF FOCUS LENS

FOCUSING APPARATUS THAT EFFECTIVELY SETS A FOCUS AREA OF AN IMAGE WHEN A FOCUSING MODE IS CHANGED

CROSS-REFERENCE TO RELATED PATENT APPLICATIONS

This application is a continuation of U.S. patent application Ser. No. 13/196,159, filed Aug. 2, 2011, which claims the priority benefit of Korean Patent Application No. 10-2010-0088055, filed on Sep. 8, 2010, in the Korean Intellectual Property Office, the entire disclosures of which are incorporated herein by reference.

BACKGROUND

1. Field of the Invention

Embodiments relate to a focusing apparatus.

2. Description of the Related Art

When manual focusing is performed, a method of enlarging an image on a screen is used in order to easily check a peak of a focal point. However, after manual focusing, if a mode is changed to an auto focusing mode, it is necessary to set a focus area irrespective of the enlarged image.

SUMMARY

Embodiments provide a focusing apparatus that can set a focus area in such a manner that focusing is effectively performed when a focusing mode is changed.

According to an embodiment, there is provided a focusing apparatus. The focusing apparatus includes a focus lens, an imaging device that captures image light passing through the focus lens and generates an image signal, a focus evaluation value calculator that inputs the image signal from the imaging device and calculates a focus evaluation value of the captured image light, a focus area setting unit that sets a first focus area in a first captured image, an auto focusing control unit that performs focusing according to a first focus evaluation value that is calculated from the first focus area by automatically adjusting a position of the focus lens, an information deriving unit that derives focus aid information corresponding to a second focus evaluation value that is calculated from a second focus area in a second captured image by manually adjusting the position of the focus lens, a display unit that displays the focus aid information, and a storage unit that stores at least one of first focus area information about the first focus area and second focus area information about the second focus area, wherein the focus area setting unit sets a third focus area in a third captured image from among the first focus area information and the second focus area information stored during another focusing.

BRIEF DESCRIPTION OF THE DRAWINGS

The above and other features and advantages will become more apparent by describing in detail exemplary embodiments with reference to the attached drawings in which.

DETAILED DESCRIPTION

Embodiments will now be described more fully with reference to the accompanying drawings, in which exemplary embodiments are shown.

(Configuration and Operation of Digital Photographing Apparatus)

A focusing apparatus, such as a digital camera, will be explained in detail. Although the digital camera is exemplified as the focusing apparatus in the present embodiment, embodiments are not limited thereto, and various other digital devices, such as a camcorder, a personal digital assistant (PDA), and a mobile phone, may be used.

Figure 1:
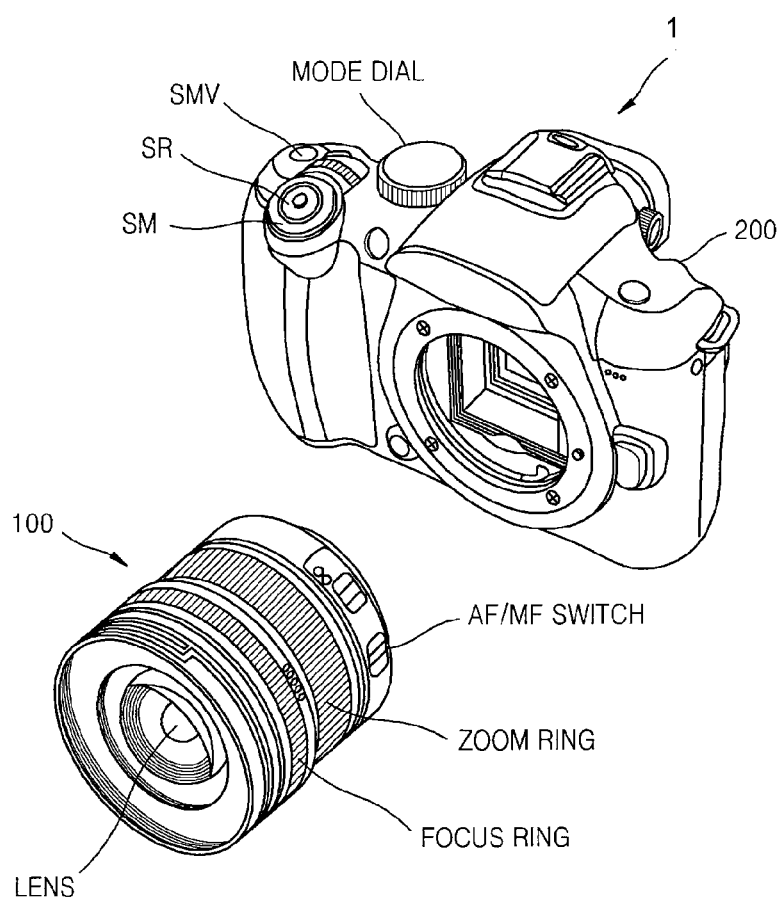
FIG. 1 is a perspective view illustrating a front surface of a focusing apparatus, such as an interchangeable lens digital camera, according to an embodiment.

FIG. 1 is a perspective view illustrating a front surface of a focusing apparatus, such as an interchangeable lens digital camera 1, according to an embodiment.

First, referring to FIG. 1, on the front surface of the interchangeable lens digital camera 1, an interchangeable lens 100 and a body 200 can be separated from each other.

The interchangeable lens 100 includes a lens and can include a zoom ring that can change a focal length of the lens and a focus ring for manual focusing around the lens. The interchangeable lens 100 can further include an auto focusing/manual focusing (AF/MF) switch as a mode conversion switch.

A mode dial that can generate a user input signal that can change a shooting mode, such as a still image mode or a moving image mode, can be provided on a top surface of the body 200. Also, a shutter release button SR that can generate another user input signal by being pressed halfway or by being pressed fully can be provided. Automatic focusing may be performed when the shutter release button SR is pressed halfway to turn on an S1 state, and an image may be captured when the shutter release button SR is pressed fully to turn on an S2 state. The body 200 may further include a button SMV that can initiate moving image shooting and a main switch SM.

Figure 2:
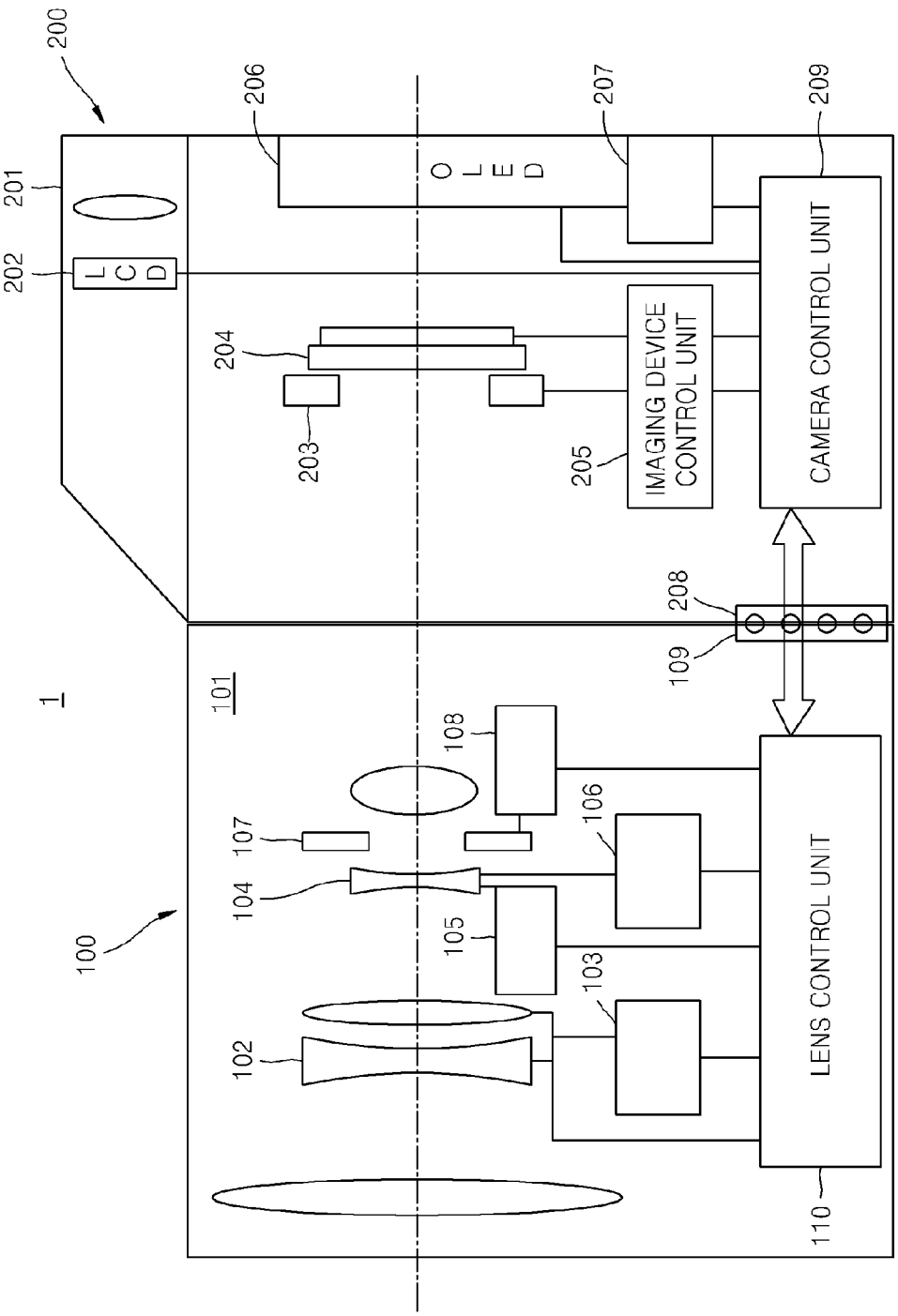
FIG. 2 is a block diagram of the interchangeable lens digital camera illustrated in FIG. 1.

As shown in FIG. 2, a first display unit 202 of a viewfinder EVF 201 that can display information about a captured image or a focus evaluation value during focusing can be provided. Also, a second display unit 206 that can display various information as well as a captured image can be provided. In addition, a menu button SN (not shown) that can select an operation of the interchangeable lens digital camera 1 can be provided. A user input signal provided by, for example, the menu button SN, can determine and can set whether to display information about a focus evaluation value, whether to enlarge a captured image during focusing, and which one from among several focusing modes is used. The focusing modes can include, for example, a focusing mode that can use a multi algorithm or a focusing mode that can use a selectable algorithm.

An operation of the interchangeable lens digital camera 1 is explained below. The interchangeable lens digital camera 1 can start operating when the main switch SM is turned on. Although the interchangeable lens digital camera 1 can operate by rotating the main switch SM in the present embodiment, embodiments are not limited thereto, and the interchangeable lens digital camera 1 may be turned on by various manipulations performed by a user, such as by pressing the main switch SM or touching the main switch SM.

The interchangeable lens digital camera 1 can display a live view image. The live view image may be displayed on the first display unit 202 of the viewfinder 201 and/or the second display unit 206. Information about a focus state (herein referred to as focus aid (FA) information) may be further displayed in the present embodiment. Although the FA information is displayed as an image on the first display unit 202 or/and the second display unit 206 in the present embodiment, embodiments are not limited thereto, and the FA information may be output as an audio signal to the user. Preferably, the FA information may be displayed during MF in which the user controls focusing.

When a still image is to be captured, while a live view image is displayed, AF can be performed by pressing the shutter release button SR halfway to turn on the S1 state. Alternatively, MF may be performed when the user adjusts the focus ring.

When the user manipulates the zoom ring, a zoom lens group can be moved. Also, when the user manipulates the focus ring, a position sensor that can sense a position of the focus lens group may detect a position of the focus ring, and a lens control circuit may control a position of the focus lens group to be changed according to a sensed signal. During AF, the focus ring need not be moved by the user's manipulation.

Exposure for still image shooting can be performed when the user fully presses the shutter release button SR to turn on the S2 state.

A still image obtained through performing an exposure by pressing the shutter release button SR fully to turn on the S2 state may be recorded and can be saved in a memory card 212 (FIG. 4) or the like. Also, the still image may be reproduced on the first display unit 202 of the viewfinder 201 or/and the second display unit 206.

FIG. 2 is a block diagram of the interchangeable lens digital camera 1 illustrated in FIG. 1. The interchangeable lens digital camera 1 can include the interchangeable lens 100 and the body 200 of the present embodiment. The interchangeable lens 100 can have a focus detection function, and the body 200 can have a function of driving a focus lens 104 in the interchangeable lens 100.

In detail, referring to FIG. 2, the interchangeable lens 100 can include an image forming optical system 101 which can include a zoom lens 102 for zoom adjustment and the focus lens 104 that can adjust a focus position, a zoom lens position sensor 103, a focus lens driver 105, a focus lens position sensor 106, an iris 107, an iris driver 108, a lens control unit 110, and a lens mount 109.

The zoom lens 102 and the focus lens 104 may each be formed as a lens group that can include a plurality of lenses.

The zoom lens position sensor 103 can sense the position of the zoom lens 102, and the focus lens position sensor 106 can sense position of the focus lens 104. A timing for sensing a position of the focus lens 104 may be set by the lens control unit 110 or a camera control unit 209 that is explained below. For example, a timing for sensing a position of the focus lens 104 may be a timing for performing focus detection from an image signal.

The focus lens driver 105 and the iris driver 108 can be controlled by the lens control unit 110 and may respectively drive the focus lens 104 and the iris 107. In particular, the focus lens driver 105 can drive the focus lens 104 in an optical axis direction.

The lens control unit 110 can transmit sensed position information of the focus lens 104 to the body 200. When there is a change in a position of the focus lens 104, or when the camera control unit 209 requests for the position information of the focus lens 104, the lens control unit 110 may transmit the sensed position information of the focus lens 104 to the body 200.

The lens mount 109 can include lens-side communication pins that can engage with camera-side communication pins, which is explained below, to be used for a transmission path through which data, a control signal, and so on can be transmitted.

A configuration of the body 200 is explained below.

The body 200 can include the viewfinder EVF 201, a shutter 203, an imaging device 204, an imaging device control unit 205, the second display unit 206, a manipulation unit 207, the camera control unit 209, and a camera mount 208.

The viewfinder 201 can be an electronic viewfinder that can have the first display unit 202 as a liquid crystal display (LCD) installed therein and thus may display a captured image in real time.

The shutter 203 can determine a time when light is applied to the imaging device 204, that is, an exposure time.

The imaging device 204 can capture image light passing through the image forming optical system 101 of the interchangeable lens 100 and can generate an image signal. The imaging device 204 may include a plurality of optoelectronic conversion units arranged in a matrix form and a vertical or/and horizontal transmission line that can read an image signal by moving electric charges from the optoelectronic conversion units. The imaging device 204 may be a charge-coupled device (CCD) sensor, a complementary metal oxide semiconductor (CMOS), or the like.

The imaging device control unit 205 can generate a timing signal and can control the imaging device 204 to pick up light in synchronization with the timing signal. Also, the imaging device control unit 205 can sequentially read a horizontal image signal when charge accumulation on scanning lines ends. The horizontal image signal can be used by the camera control unit 209 for focus detection.

Various kinds of images and information can be displayed on the second display unit 206. Although the second display unit 206 can be an organic light-emitting diode (OLED) in the present embodiment, embodiments are not limited thereto, and the second display unit 206 may be any of various display devices such as an LCD.

The manipulation unit 207 can be for inputting various types of commands from the user in order to manipulate the interchangeable lens digital camera 1. The manipulation unit 207 may include various buttons such as the shutter release button SR, the main switch SM, the mode dial, and the menu button SN. Although buttons, dials, etc. are shown in the present embodiment, embodiments are not limited thereto, and a touch panel mounted inside or outside the display unit 206 may be provided.

The camera control unit 209 can calculate a focus evaluation value by performing focus detection on an image signal generated by the imaging device 204. Also, a focus evaluation value at every focus detection time in response to a timing signal generated by the imaging device control unit 205 can be stored, and a focus position can be calculated by using the stored focus evaluation value and lens position information received from the interchangeable lens 100. A calculation result of the focus position can be transmitted to the interchangeable lens 100. The camera mount 208 can include the camera-side communication pins.

An operation of the interchangeable lens 100 and the body 200 is briefly explained below.

When a subject is to be photographed, an operation of the interchangeable lens digital camera 1 can be initiated by manipulating the main switch SM, which can be included in the manipulation unit 207. The interchangeable lens digital camera 1 can perform a live view display as follows.

Image light of the subject passing through the image forming optical system 101 can be incident on the imaging device 204. At this time, the shutter 203 can be open. The imaging device 204 can convert the incident image light of the subject into an electrical signal to generate an image signal. The imaging device 204 can be operated by a timing signal, which can be generated by the imaging device control unit 205. The generated image signal can be converted into displayable data by the camera control unit 209 and can be outputted to the first display unit 202 of the viewfinder 201 and the second display unit 206. Such an operation can be the live view display, and live view images displayed by the live view display may be continuously displayed as a moving image.

After the live view display is performed, when the shutter release button SR, which can be one component of the manipulation unit 207, is pressed halfway, the interchangeable lens digital camera 1 can start an AF operation. The AF operation can be performed by using the image signal generated by the imaging device 204. For example, in detail, in a contrast AF method, a position of the focus lens 104 can be calculated from a focus evaluation value corresponding to a contrast value, and the focus lens 104 can be driven according to the calculated position. The focus evaluation value can be calculated by the camera control unit 209. The camera control unit 209 can calculate information for controlling the focus lens 104 from the focus evaluation value and can transmit the information to the lens control unit 110 via the lens-side and camera-side communication pins respectively included in the lens mount 109 and the camera mount 208.

The lens control unit 110 can control the focus lens driver 105 based on the received information, and the focus lens driver 105 can perform AF by driving the focus lens 104 in an optical axis direction according to the control. A position of the focus lens 104 can be monitored by the focus lens position sensor 106 to perform a feedback control.

When the zoom lens 102 is zoomed by the user, a position of the zoom lens 102 can be detected by the zoom lens position sensor 103, and the detected position of the zoom lens 102 may be used for AF control of the focus lens 104 by the lens control unit 110 or may be used for other controls.

When an image of the subject is in an in-focus state, the shutter release button SR can be fully pressed to turn on the S2 state, and the interchangeable lens digital camera 1 can perform exposure. At this time, the camera control unit 209 can fully close the shutter 203 and can transmit measured light information obtained hitherto by the lens control unit 110 as iris control information. The lens control unit 110 can control the iris driver 108 based on the iris control information and can adjust a value of the iris 107. The camera control unit 209 can control the shutter 203 based on the measured light information and can capture an image of the subject by opening the shutter 203 for an appropriate exposure time.

The captured image can be image signal processed, can be compressed, and can be stored in the memory card 212. Also, the captured image may be displayed on the first display unit 202 or the second display unit 206. A mode, other than a reproduction mode, in which an image is displayed right after shooting, can be called a quick view mode, and the image displayed in the quick view mode can be called a quick view image.

Figure 3:
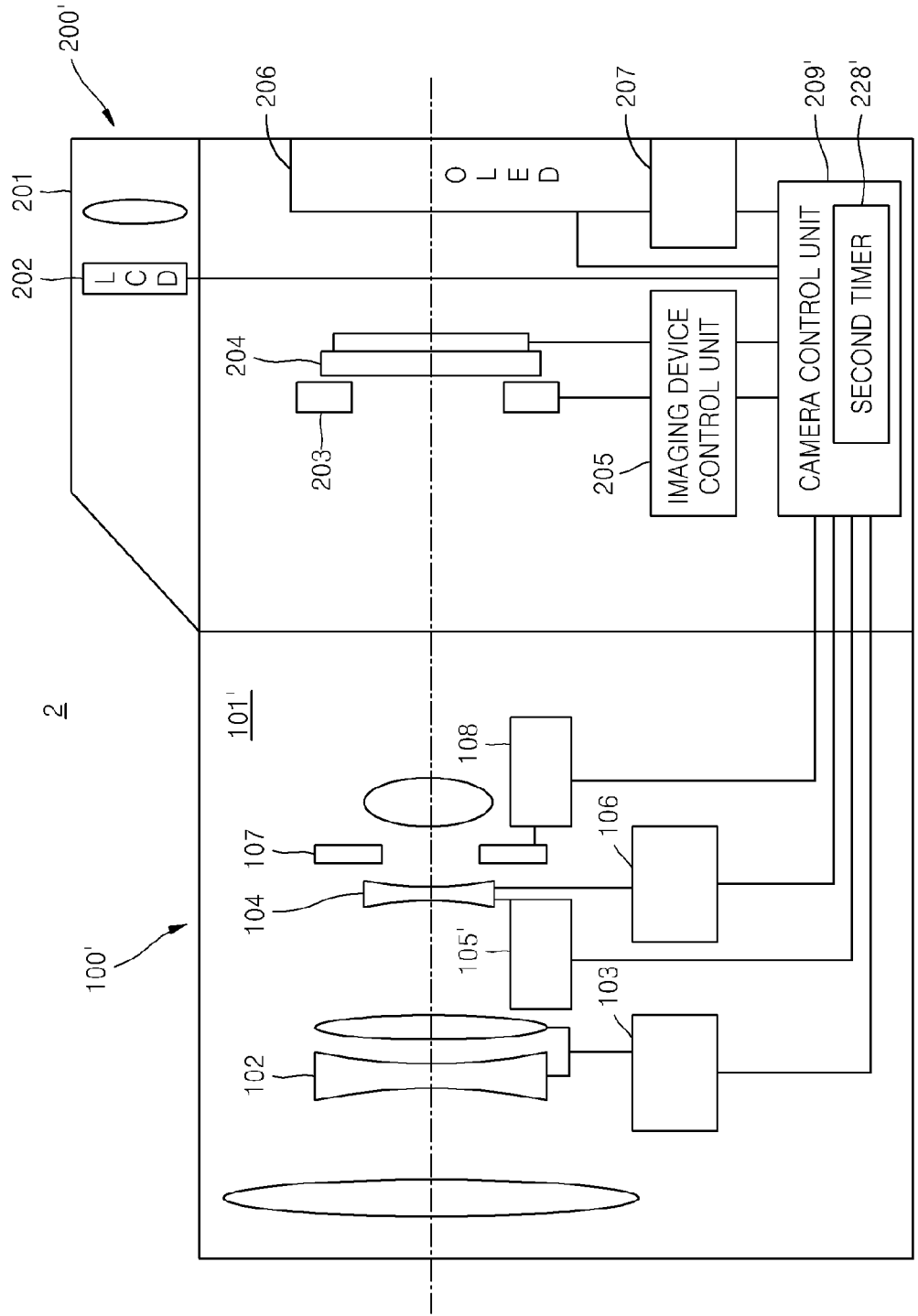
FIG. 3 is a block diagram of a compact digital camera as a focusing apparatus according to another embodiment.

FIG. 3 is a block diagram illustrating a compact digital camera 2 as a focusing apparatus according to another embodiment. In the present embodiment, a digital camera from which a lens is not detachable, unlike the interchangeable lens digital camera 1 of FIG. 2, is illustrated. The present embodiment will be explained by focusing on a difference from the interchangeable lens digital camera 1 of FIG. 2.

Referring to FIG. 3, the compact digital camera 2 can include a lens unit 100' and a body unit 200' that may not be separated from each other. Also, since the lens unit 100' and the body unit 200' can be integrated with each other, the lens mount 109 and the camera mount 208 may not be provided. Accordingly, a camera control unit 209' can directly control a lens driver 105' and the iris driver 108. In the present embodiment, the lens driver 105' may drive the image forming optical system 101' under the control of the camera control unit 209'. The image forming optical system 101' may include the zoom lens 102 and the focus lens 104. Also, the iris driver 108 may also drive the iris 107 under the control of the camera control unit 209'. Also, the camera control unit 209' can directly receive position information from the zoom lens position sensor 103 and the focus lens position sensor 106. That is, in the present embodiment, the camera control unit 209' can also function as the lens control unit 110 of FIG. 2. Also, in the present embodiment, a focus evaluation value and a lens position may be synchronized by using a second timer 228'.

[Control Circuit and Operation of Camera]

Figure 4:
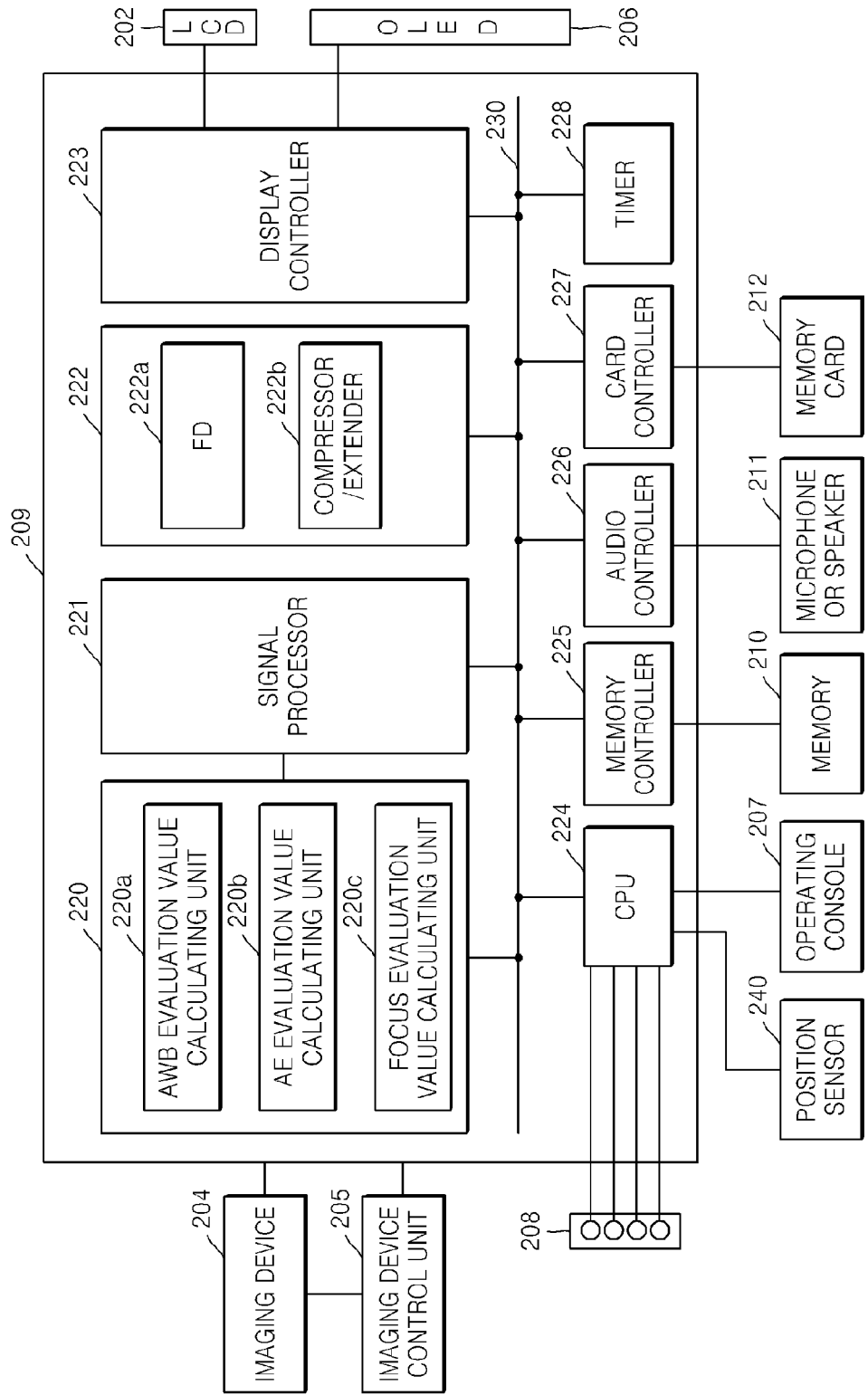
FIG. 4 is a block diagram of a camera control unit in the interchangeable lens digital camera illustrated in FIG. 2.

FIG. 4 is a block diagram of the camera control unit 209 in the interchangeable lens digital camera 1 illustrated in FIG. 2. Although the camera control unit 209 of the interchangeable lens digital camera 1 illustrated in FIG. 2 is described, embodiments are not limited thereto, and the description may apply to the camera control unit 209' of the compact digital camera 2 illustrated in FIG. 3. However, the camera control unit 209 illustrated in FIG. 2 can further include the lens control unit 110.

Referring to FIG. 4, the camera control unit 209 may include a pre-processing unit 220, a signal processor 221, an application unit 222, a display controller 223, a central processing unit (CPU) 224, a memory controller 225, an audio controller 226, a card controller 227, a timer 228, and a main bus 230.

The camera control unit 209 can transmit various types of instructions and data via the main bus 230 to each element.

The pre-processing unit 220 can receive an image signal generated by the imaging device 204 and can include an auto white balance (AWB) evaluation value calculating unit 220a that can calculate an AWB evaluation value for white balance adjustment, an auto exposure (AE) evaluation value calculating unit 220b that can calculate an AE evaluation value for exposure adjustment, and a focus evaluation value calculating unit 220c that can calculate a focus evaluation value for focus adjustment. The focus evaluation value may include a horizontal evaluation value that can indicate a horizontal contrast. The horizontal focus evaluation value can be calculated by directly receiving a horizontal image signal read from the imaging device 204.

The signal processor 221 can generate a live view image or a captured image that can be displayed on the display unit 202, by performing a series of image signal processing such as gamma correction.

The application unit 222 can perform face detection from an image signal on which the image signal processing has been performed. A face detector (FD) 222a that can determine an area of a face, that is, an inner range, by performing detection can be provided. Also, a compressor/extender 222b that can compress and can extend the image signal on which the image signal processing has been performed can be provided. For example, an image signal can be compressed in a compression format, such as a joint photographic experts group (JPEG) compression format or an H.264 compression format. An image file including image data generated by the compression processing can be stored in the memory card 212.

The display controller 223 can control an image output to the first display unit 202 of the viewfinder 201 or the second display unit 206.

The CPU 224 can generally control an operation of each component. In the case of the interchangeable lens digital camera 1 of FIG. 2, the CPU 224 can communicate with the lens control unit 110.

The memory controller 225 can control a memory 210 that can temporarily store data, such as associated information or a captured image, and the audio controller 226 can control a microphone or speaker 211. Also, the card controller 227 can control the memory card 212 for recording a captured image. The timer 228 can measure a time.

An operation of the camera control unit 209 will now be briefly explained. When a manipulation signal is inputted to the CPU 224 from the manipulation unit 207, the CPU 224 can operate the imaging device control unit 205. The imaging device control unit 205 can operate the imaging device 204 by outputting a timing signal. When an image signal is inputted to the pre-processing unit 220 from the imaging device 204, AWB and AE calculation can be performed. A result of the AWB and AE calculation can be fed back to the image device control unit 205 to generate an image signal with appropriate exposure and appropriate color from the imaging device 204.

Meanwhile, when an operation of the digital camera 1 is initiated to perform live view display, the camera control unit 209 can input an image signal captured with appropriate exposure to the pre-processing unit 220 to calculate an AE evaluation value, an AWB evaluation value, and a focus evaluation value. An image signal for a live view display may be directly applied to the signal processor 221 without passing through the main bus 230, and the signal processor 221 may perform image signal processing such as interpolation processing of pixels. The image signal on which the image signal processing has been performed can pass through the main bus 230 and the display controller 223 and can be displayed on the first display unit 202 of the viewfinder 201 and the second display unit 206. The live view display may be basically updated at a frame rate of 60 frames per second (fps), but embodiments are not limited thereto. That is, the live view display may be updated at a frame rate of 120 fps, 180 fps, or 240 fps. The updating frame rate may be set by the CPU 224 based on a measured light result, an AF condition, or the like. However, the updating frame rate may be adjusted according to a timing signal by the imaging device control unit 205.

When the shutter release button SR is pressed halfway, the CPU 224 can sense an S1 signal corresponding to the halfway-pressing. The CPU 224 can instruct the lens control unit 110 via the lens-side and camera-side communication pins included in the lens mount 109 and the camera mount 208 to initiate driving of the focus lens 104 for an AF operation. Alternatively, when the CPU 224 senses the S1 signal corresponding to the halfway-pressing, the CPU 224 can control driving of the focus lens 104 for an AF operation. That is, the CPU 224 may function as a main control unit.

Also, the CPU 224 can acquire an image signal from the imaging device 204, and the focus evaluation value calculating unit 220c of the pre-processing unit 220 can calculate a focus evaluation value. The focus evaluation value can be calculated as the focus lens 104 is moved. A position of the focus lens 104 where a contrast of an image of a subject is at a maximum can be calculated from a change in the focus evaluation value, and the focus lens 104 can be moved to the calculated position. For example, the position of the focus lens 104 may be a position where the focus evaluation value is at a maximum. This series of operations can be an AF operation, and live view images may be continuously displayed even during the AF operation. An image signal used for a live view image may be identical to an image signal used to calculate a focus evaluation value.

{Focus Area (AF Area, FA Area)}

FIGS. 5 through 9 are views for explaining a focus area.

Figure 5:
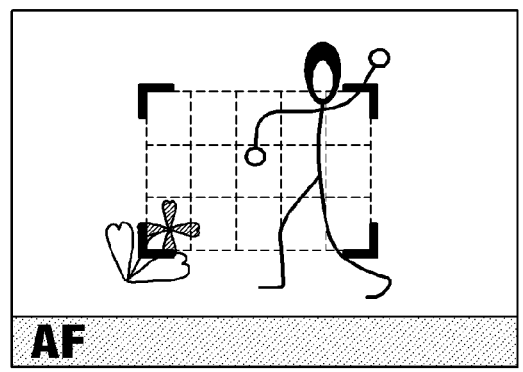
FIG. 5 is a view for explaining a method of setting a focus area in multi detection auto focusing (AF) in which a main subject area is automatically detected and a focus area is set.

FIG. 5 is a view for explaining a method of setting a focus area in a multi AF mode. Referring to FIG. 5, where a subject exists can be determined from among, for example, 15 divided areas, and any one of the 15 divided areas may be set as a focus area X by using a main subject detection algorithm. AF may be performed by performing focus detection from image information of the focus area X (in the multi AF mode).

Figure 6:
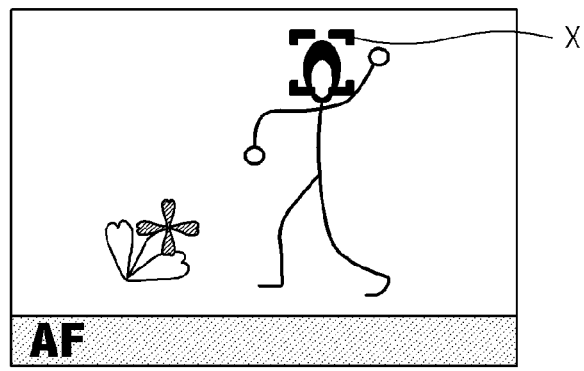
FIGS. 6 through 8 are views for explaining a method of setting a focus area in a user selectable AF mode in which a focus area determined by a user's selection is set.
Figure 7:
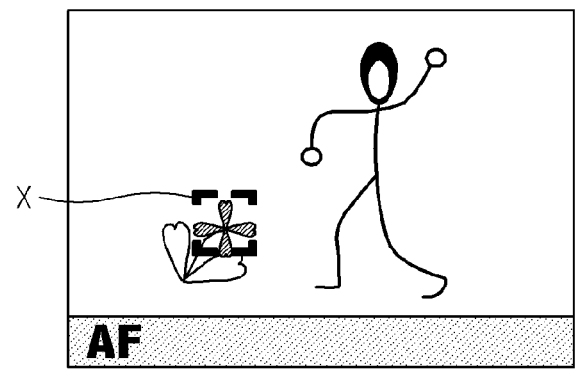
Figure 8:
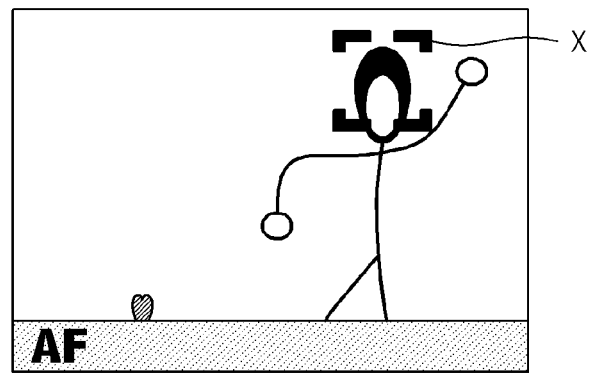

FIGS. 6 through 8 are views for explaining a method of setting a focus area in a user selectable AF mode. The method can be referred to as a user selectable AF area mode. A position of a focus area X may be selected and may be determined by using a cross key or a touch panel of the camera from among several positions in an image on a screen. A position of the focus area X may be set to an entire shooting range. Also, the focus area X selected by the user may be formed to have any of a plurality of sizes. FIG. 6 illustrates that the focus area X is set to a person's face, and FIG. 7 illustrates that the focus area X is set to a flower. FIG. 8 illustrates that when a size of the face is increased by changing a focal length of the interchangeable lens 100, a size of the focus area X selected by the user can also be set to be increased.

Figure 9:
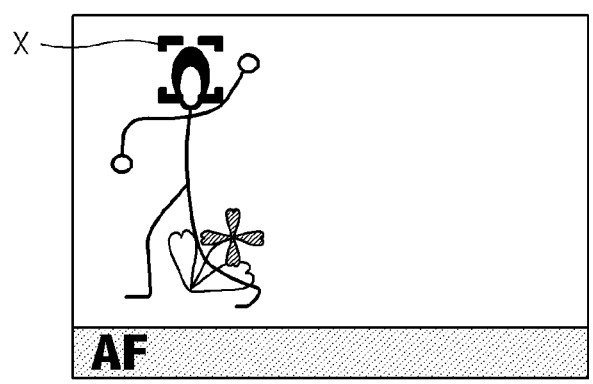
FIG. 9 is a view for explaining a method of setting a focus area in a face detection AF mode in which a focus area including a face area detected according to a face detection algorithm is set.

FIG. 9 is a view for explaining a method of setting a focus area X in a face detection AF mode. A face area where a face exists can be detected from image information by the FD 222a of FIG. 4, and the detected face area can be marked with a solid line or lines. In the face detection AF mode, the focus area x may be set to an area within the solid line or lines.

AF can be performed based on image information of a focus area set by the aforementioned methods. However, there may be times when the user may want to slightly change framing, times when the subject may have moved, and times when the user may want to slightly change a focus position. In this case, the AF mode can be changed to an MF mode. Alternatively, if the user wants to rapidly change focus after AF, MF may be performed simply by manipulating the focus ring, without changing a focusing mode of the camera, which is called direct manual focusing (DMF). While a conventional contrast AF camera performs focusing by enlarging a live view image, it is not easy to perform fine focusing on an enlarged image. Accordingly, according to an embodiment, MF may be effectively performed by displaying FA information during the MF.

FIGS. 10 through 13 are views illustrating examples of FA information.

Figure 10:
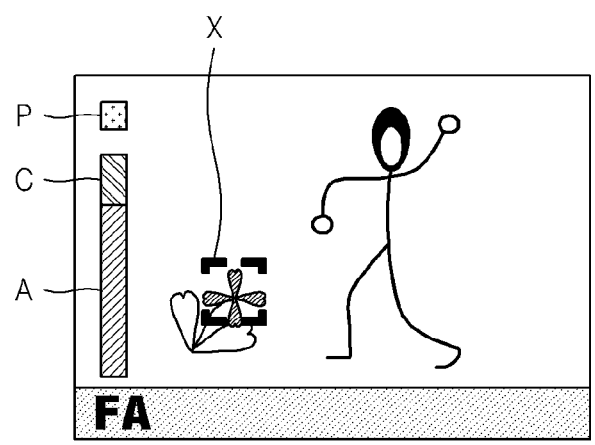
FIGS. 10 through 13 are views for explaining examples of focus aid (FA) information in an FA mode in which a focus state is displayed during manual focusing (MF)

First, referring to FIG. 10, a focus area X is set to a flower. The focus area X can be referred to as an FA area. FA information corresponding to a focus evaluation value in the FA area can be displayed as a bar image on a left side of a screen. Focus detection can be performed based on image information in the FA area, and a focus evaluation value (corresponding to a contrast) can be displayed as a result of the focus detection. The higher the bar image, the better the focus may be.

The FA information may include first information (sparse part) that can indicate a large difference between focus evaluation values and second information (dense part) that can indicate a small difference between focus evaluation values. The first information can be a mantissa part, and the second information may be an exponent part. Alternatively, the first information may be a linear arithmetic value of the mantissa part, and the second information may be a linear arithmetic value of the exponent value. Alternatively, the first information can be a numerical value within an effective range of a binary number, and the second information may be a shift value.

For example, the focus evaluation value may range from 0 to several million, and may range from 100 to several million when a noise component is removed. The focus evaluation value may be expressed as $A*N^B$, where A is a mantissa part, N is a base, and B is an exponent part. For example, when N=10, if $1*10^2$ is to be obtained, then A=1 and B=2. If the focus evaluation value is 5 million, when N=10, then $5*10^6$ is obtained so that A=5 and B=6. The base N can be 10 for when a decimal number is to be used. If a binary number is to be used, N may be set to 2. For example, if the focus evaluation value is 100, when N=2, then $1.5625*2^6$ is obtained so that A=1.5625 and B=6. If the focus evaluation value is 5 million, when N=2, then $1.192*2^{22}$ is obtained so that A=1.1921 and B=22. In an FA display, an exponent part may be 22, and a mantissa part may be numbers adjacent to a decimal point, that is, 19. By setting an exponent part to a maximum of 25 and a mantissa part to a maximum of 99, that is, by restricting a maximum scale, the user may more easily distinguish an exponent part from a mantissa part.

Alternatively, if the focus evaluation value is 5 million, when N=10, then $5*10^6$ is obtained so that A=5 and B=6. The mantissa part A may be first information that can indicate a large difference between focus evaluation values or a dense part displaying a detailed portion, and the exponent part B may be second information that can indicate a small difference between focus evaluation values or a sparse part displaying a compressed portion.

Alternatively, the focus evaluation value may be defined by C=(B−2)*10. If A ranges from 1 to 10 and B ranges from 0 to 6, C can range from 0 to 40. When a maximum scale is set to 50, the focus evaluation value ranging from 100 to 10 million may be displayed by using A and C. In consideration of image noise, the reason for the focus evaluation value having a minimum value of 100 is because focus evaluation values ranging from 0 to 100 can have little reliability. As a size of a focus evaluation value is increased, information corresponding to the increased focus evaluation value can be transmitted to the user.

Alternatively, if a binary number is used, that is, if N=2, when effective bits are, for example, the most significant 6 bits, a value can be shifted rightwards until the most signifi-cant 6 bits of the focus evaluation value are calculated in the CPU. An effective value, that is, the most significant 6 bits, can refer to a value from 0 to 63 when a decimal number is used, and the number of times a value is shifted rightwards can be an exponent of 2. For example, when a value is shifted rightwards 15 times until an effective value of 63 is determined, a focus evaluation value becomes $63\times 2^{15}$. Thus, in this case, 63 can be second information that can correspond to a dense part, and 15 can be first information that can correspond to a sparse part.

Figure 11:
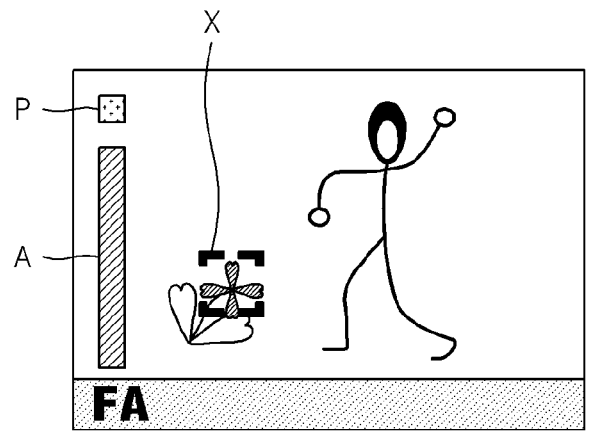

Referring back to FIG. 10, first information and second information can be separately displayed. Accordingly, a peak position may be more easily confirmed, and a peak hold P in red color can be provided for about 2 seconds. The peak hold may be output as an audio signal or displayed as an icon on the second display unit 206. Also, FIG. 11 illustrates the first information and the second information not separately displayed to simplify expression. Although two pieces of information can be separated in the camera, the two pieces of information may be expressed unitarily.

Figure 12:
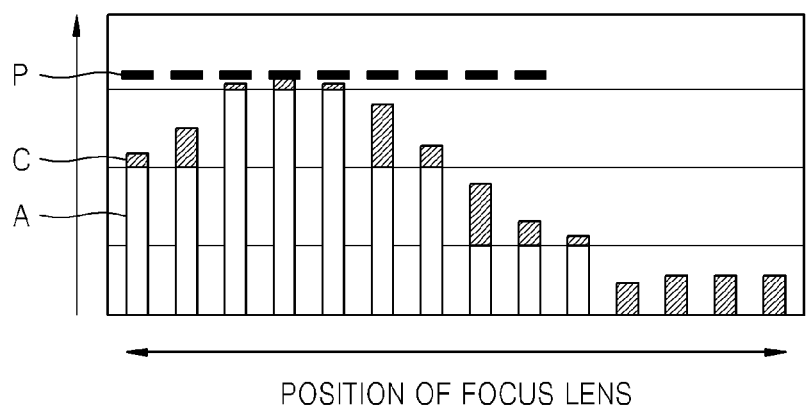

FIG. 12 is a graph for explaining how a focus evaluation value is changed, when the first information and the second information are separated, by manipulating the focus ring.

Referring to FIG. 12, a vertical axis can represent a contrast, that is, a focus evaluation value, and each bar image can be divided into 3 areas. C of the second information in C=(B−2)*10 can be displayed at a lower portion of the bar images, and A of the first information can be displayed after C is displayed. A maximum value can be regarded as a peak value, and peak value information corresponding to the peak value may be generated and displayed for a predetermined period of time. That is, a peak hold P may be further displayed. The peak hold P may be displayed for 2 seconds. Referring back to FIG. 10, FIG. 10 illustrates only one bar image in the graph.

Figure 13:
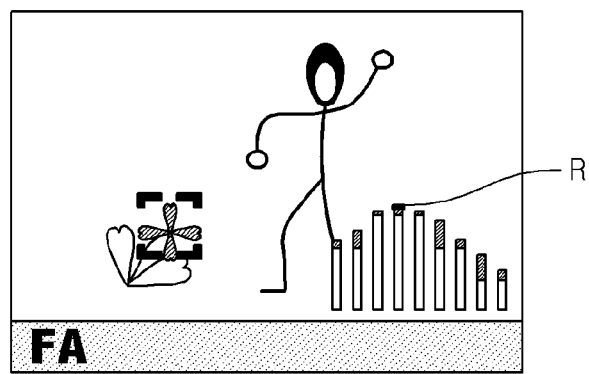

FIG. 13 illustrates another example of an FA display in which a current focus lens position, instead of peak value information in the graph of FIG. 12, is further displayed. Focus evaluation values with respect to a position of the focus lens changed by manipulating the focus ring in a first direction can be sequentially displayed, and detection evaluation values due to the manipulation of the focus ring can be sequentially displayed. Since a focus evaluation value when the focus ring is manipulated in a second direction can already be calculated, only a current focus lens position R may need to be further displayed. That is, by illustrating the distribution of focus evaluation values in the present embodiment, the user may more easily confirm a focus state according to a position of the focus lens 104. In the present embodiment, all of a plurality of lines are displayed similar to the graph of FIG. 12.

In the following embodiments, how stored focus area information about a focus area can affect improvement in focusing speed or manipulation will be explained.

First, when the user is able to set a focus area, the user may select any one of a user selectable AF area mode, a multi AF area mode in which a focus area can be set by using a multi algorithm, and a face detection AF area mode in which a focus area can be set by using a face detection algorithm. AF can be performed on a set focus area according to the mode selected. Also, a 1-1 focus area may be set according to the selectable AF area mode, a 1-2 focus area may be set according to the multi AF area mode, and a 1-3 focus area may be set according to the face detection AF area mode.

Any AF area mode may be changed to an FA mode. The FA mode can be a selection area type in which a position and a size of a second focus area (an FA area) of an FA mode may be set in order to precisely adjust a focus state of a specific position. That is, when a multi AF area mode or a face detection AF area mode is changed to an FA mode, an FA area may be set to a selection AF area type. Also, a position of a focus area (here, an FA area) may be set within a range of an entire screen as in a user selectable AF area mode. When the FA mode is changed again to the AF mode, a third focus area can be set. The third focus area may be set according to information of a focus area used in previous AF.

Figure 14:
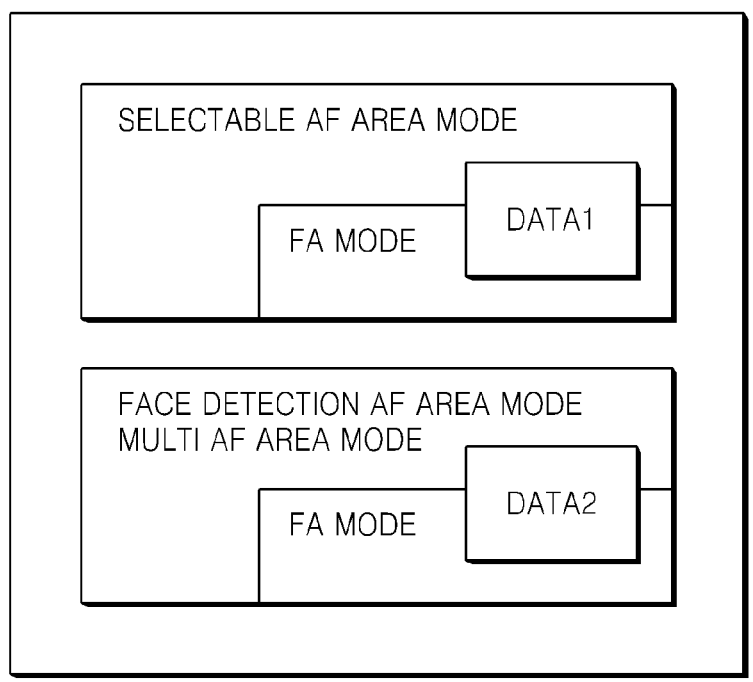
FIGS. 14 through 18C are block diagrams for explaining a method of setting a focus area during another focusing after the FA mode.

FIG. 14 is a block diagram for explaining a method of setting a focus area, during another focusing after the FA mode. Focus area information about an AF area and an FA area of a selection area type can include first focus area information DATA1 that can correspond to a position and a size. Focus area information about an AF area and an FA area of another multi AF area mode or face detection AF mode can include second focus area information and third focus area information DATA2 that can correspond to a position and a size. The information DATA1 and the information DATA2 can be respectively stored in storage units, and the storage units may be included in a memory. Also, the storage unit in which the information DATA1 is stored may retain the first focus area information DATA1 even when a power switch of the focusing apparatus, that is, the camera, is turned off, and the information DATA2 may be removed when the power switch is turned off. Although the second focus area information and the third focus area information can be stored in the same storage unit in the present embodiment, embodiments are not limited thereto, and the second focus area information and the third focus area information may be stored in separate storage units.

Figure 15A:
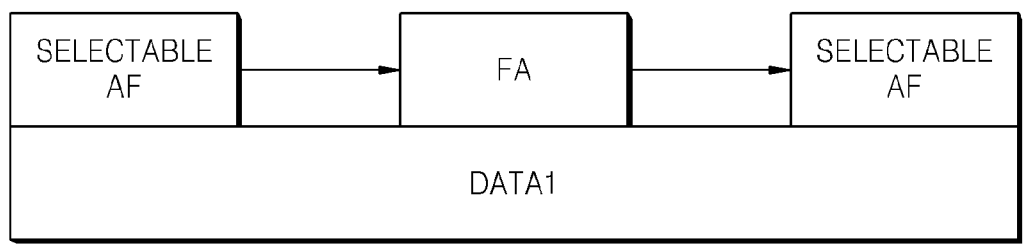
Figure 15B:
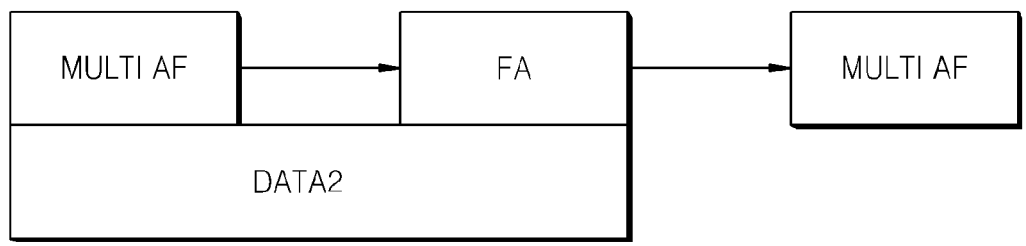
Figure 15C:
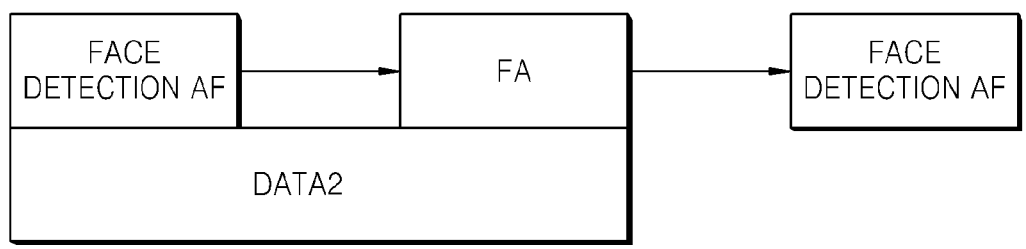

FIGS. 15A through 15C are block diagrams for explaining the method of FIG. 14 in detail. FIG. 15A illustrates a case where a mode is changed from a selectable AF area mode to an FA mode. First focus area information DATA1, that can correspond to position and size information of an AF area (a 1-1 focus area) set during a selectable AF mode, can be used as setting information of an FA area (a second focus area) in an FA mode. When the FA mode is changed again to the selectable AF mode, the first focus area information DATA1 can be used. Accordingly, in the selectable AF mode, which is another focus detection mode, a focus area used in the FA mode may be speedily used.

FIG. 15B illustrates a case using a multi AF area mode. During the multi AF mode, the camera can automatically set an AF area (a 1-2 focus area). First focus area information DATA2 about the 1-2 focus area can be stored. When the multi AF mode is changed to an FA mode, FA can be initiated by using the first focus area information DATA2. When the FA mode is changed again to a multi AF area mode, the camera can automatically set an AF area (a third focus area) without using the focus area information (the first focus area information DATA 2) in the FA mode. The first focus area information DATA2 set in the FA mode in the multi AF area mode may not be used in an FA mode in the selectable AF area mode.

FIG. 15C illustrates a case using a face detection AF area mode. During AF, the camera can automatically set an AF area (a 1-3 focus area). A result can be stored as information DATA2. A subsequent process can be the same as that in the multi AF area mode, and thus an explanation thereof will not be given.

Figure 16:
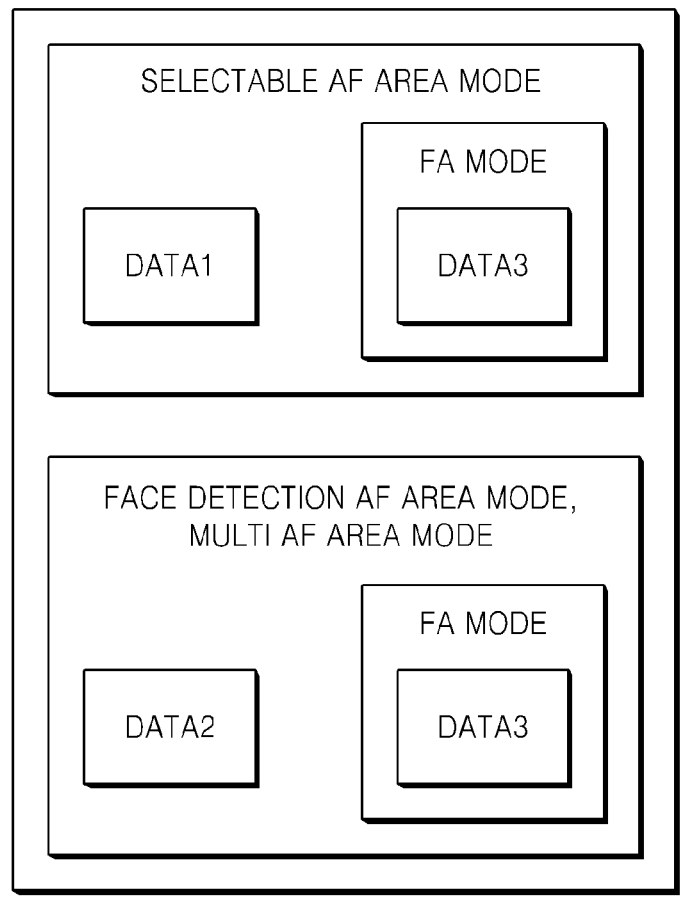

FIG. 16 is a block diagram for explaining a method of setting a focus area, according to another embodiment. There may be three storage units that can store information DATA. The three storage units respectively can store information DATA1 for a selectable AF area mode, information DATA2 for a multi AF area mode and a face detection AF mode, and information DATA3 for each FA mode. The information DATA1 and DATA3 may be saved even when a main switch of the focusing apparatus is turned off, and the information DATA2 may be removed when the main switch is turned off.

Figure 17A:
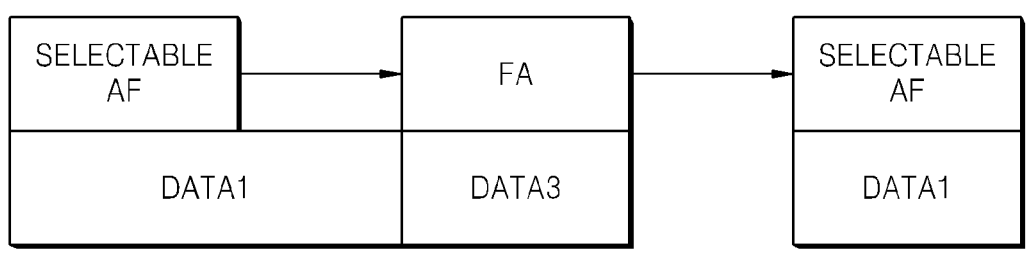
Figure 17B:
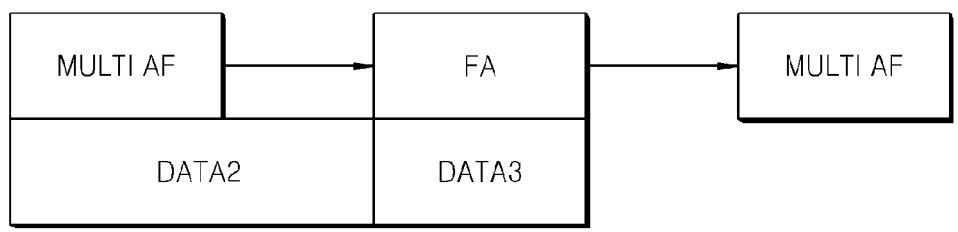
Figure 17C:
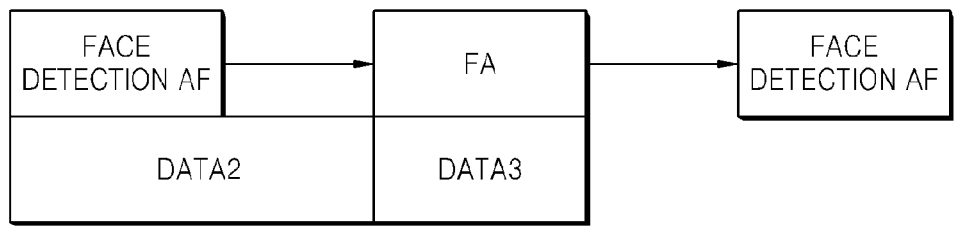

FIGS. 17A through 17C are block diagrams for explaining the method of FIG. 16 in detail. FIG. 17A illustrates a case where a selectable AF area mode is changed to an FA mode. Information DATA1 that can correspond to position and size information of an AF area set during a selectable AF mode may be used as setting information of an FA area. When the FA mode is changed again to the selectable AF area mode, position and size information used in the FA mode can be recorded as DATA3. In the selectable AF area mode, the previously used position and size information DATA1 can be used again. Speedy focusing may be performed by using the focus area set in the previous selectable AF area mode.

FIG. 17B illustrates a case using a multi AF area mode. During the multi AF mode, the camera can automatically set an AF area. A result can be stored as DATA2. When the multi AF mode is changed to an FA mode, FA can be initiated by using the information DATA2. When the FA mode is changed again to a multi AF area mode, information in the FA mode can be recorded as DATA3. In the multi AF area mode, the camera can automatically set an AF area. When the AF mode is changed to the selectable AF area mode, the stored information DATA3 can be used. That is, information set during the FA mode may be used to set the same focus area in an FA mode in any AF mode as long as focus area information is not changed by the AF mode.

FIG. 17C illustrates a case using a face detection area AF mode. The face detection area AF mode can be the same as the multi AF area mode, and thus a detailed explanation thereof will not be given.

Figure 18A:
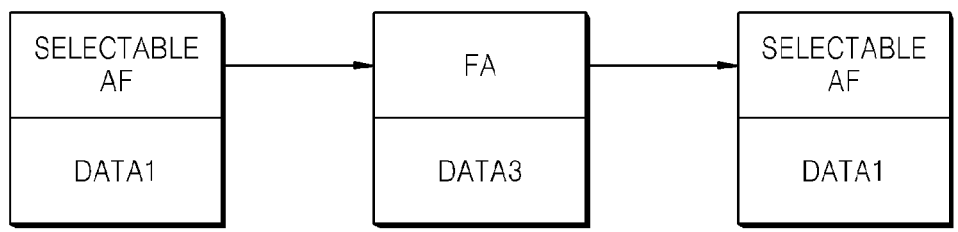
Figure 18B:
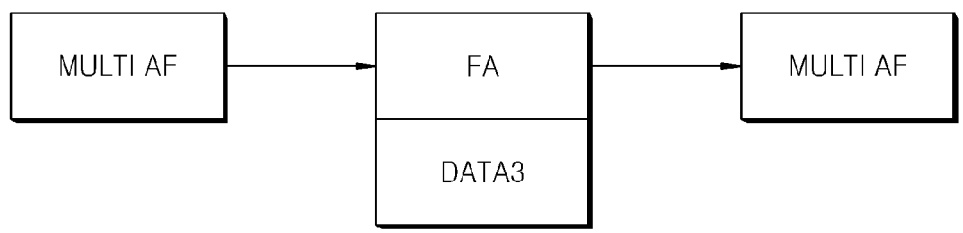
Figure 18C:
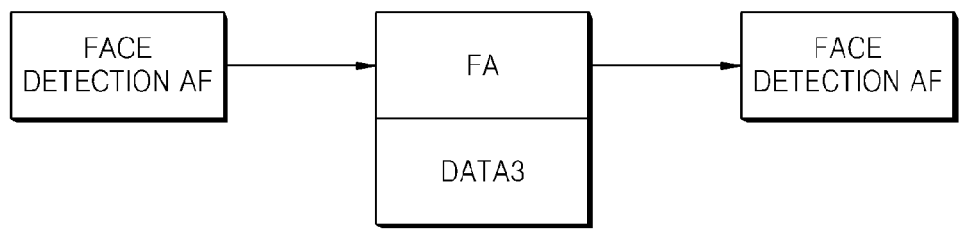

FIGS. 18A through 18C are block diagrams for explaining a method of setting a focus area, according to another embodiment. FIG. 18A illustrates that, although information DATA1 is used in a selectable AF area mode, when the selectable AF area mode is changed to an FA mode, the information DATA1 need not be used, and information DATA3 used in a previous FA mode can be used. Whether or not focus area information used in an AF mode is changed, focus area information used in an FA mode can be used only in an FA mode. That is, since a focus area may be set independently in an FA mode, when shooting is mostly performed in an FA mode, speedy manipulation may be performed.

FIG. 18B illustrates a case using a multi AF area mode. Although an AF area is selected in a multi AF area mode, predetermined information can be selected. For example, an FA area can be a central position and can have a standard size. Even when a contrast of a subject is low and focus detection is impossible in the multi AF area mode, the same processing as that in FIG. 18A can be performed. Alternatively, position and size information of information DATA3 used in a previous time may be used. When the FA mode is changed to the multi AF area mode, position and size of the FA area in the FA mode can be stored in the information DATA3. The following is the same as that of FIG. 17A.

FIG. 18C illustrates a case using a face detection AF area mode. The face detection AF area mode can be the same as the multi AF area mode, and thus a detailed explanation thereof will not be given.

FIGS. 19A through 21D are views for explaining how a focus area is displayed, according to an embodiment. FIGS. 19A through 21D illustrate examples where a focus area can be displayed on the first display unit 202 (see FIG. 4) of the viewfinder EVF 201 or the second display unit 206 (see FIG. 4) on a rear surface of the camera for performing an FA display. Methods of setting a focus area in the aforesaid selectable AF area mode, multi AF area mode, and face detection AF area mode are exemplified.

Figure 19A:
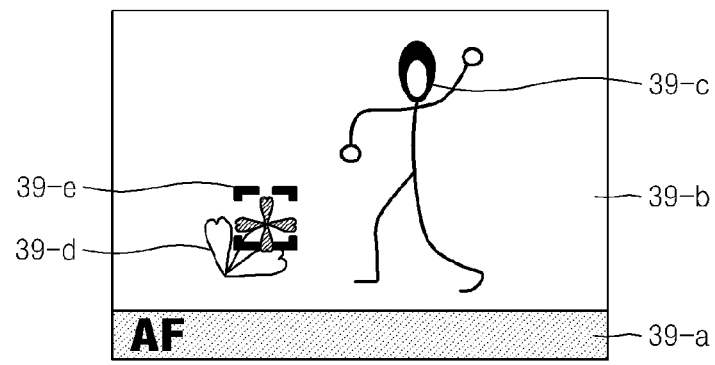
FIGS. 19A through 21D are views for explaining how a focus area is displayed in the focusing apparatus according to an embodiment.

FIGS. 19A through 19D are views for explaining a focus area in an AF mode and an FA mode when a selectable AF area mode is selected. In FIG. 19A, 39-*a* denotes an information display area that can display a shutter speed or an AF mode, 39-*b* denotes a live view screen that can display in real time an image captured by an image sensor, 39-*c* denotes a person, 39-*d* denotes a flower, and 39-*e* denotes an AF area set by the user. In this case, the user is trying to focus the flower.

Figure 19B:
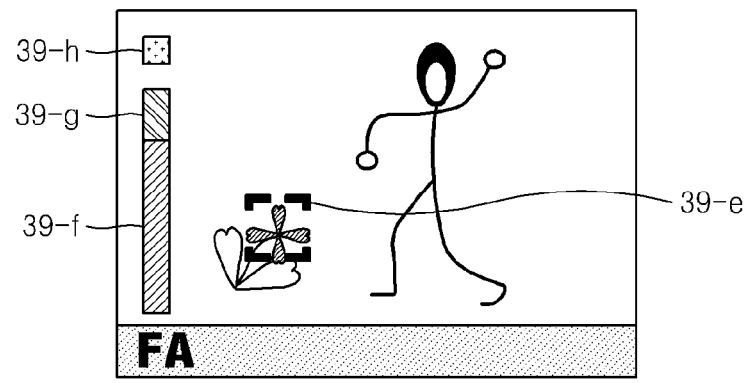

FIG. 19B illustrates a case where the AF mode of FIG. 19A is changed to an FA mode. The AF area set by the user can be used as an FA area in the FA mode. 39-*f* is second information that can indicate an exponent part of a focus evaluation value or a linear arithmetic value of the exponent part, 39-*g* is first information that can indicate a mantissa part of a focus evaluation value or a linear arithmetic value of the mantissa part, and 39-*h* is a peak hold of a focus evaluation value that can be stored and retained. When a selectable AF area mode is selected, even though the AF mode is changed to the FA mode, since the user's setting is stored and retained, FA may be performed within a desired range.

Figure 19C:
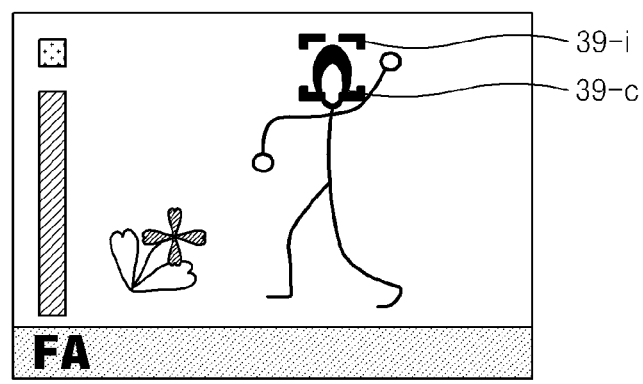

FIG. 19C illustrates a case where in the FA mode, the user changes a position of the FA area. While the user selects the flower 39-*d* in FIG. 19B, in the FA mode, the FA area is moved to a position of a face 39-*i* of the person 39-*c*. When the user changes the AF mode to the FA mode, the position of the FA area can be moved. As a result, in the FA mode, the user may change a position where a focus is desired, that is, a position of a focus area, thereby reflecting the user's intention.

Figure 19D:
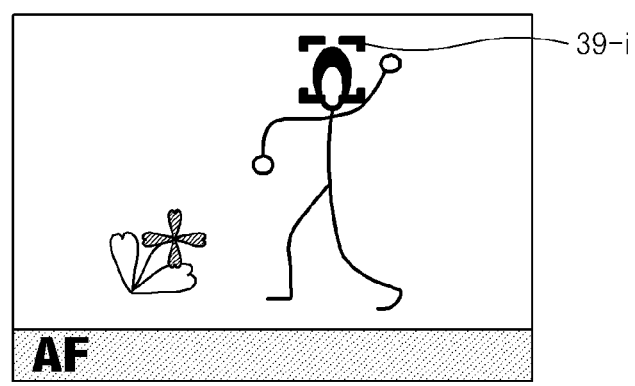

FIG. 19D illustrates a case where the FA mode is changed again to the AF mode. The AF area can be set to the FA area, which is the face 39-*i*, selected by the user in the FA mode.

As described above, in the selectable AF area mode, the user's setting can always be stored without being affected by a change between the AF mode and the FA mode, and a focus area may be set according to the user's intention even when the focus area is set based on stored focus area information.

FIGS. 20A through 20E illustrate a case using a multi AF area mode.

Figure 20A:
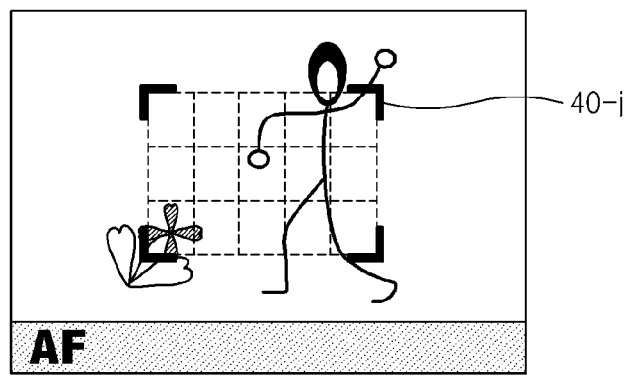

Referring to FIG. 20A, 40-*j* denotes a detection area of the multi AF area mode. In the multi AF area mode, 15 (5×3) detection blocks can be marked by dotted lines. The camera can select an optimal block where it may be determined that a main subject exists by using a predetermined multi algorithm and may set the selected block as a focus area.

Figure 20B:
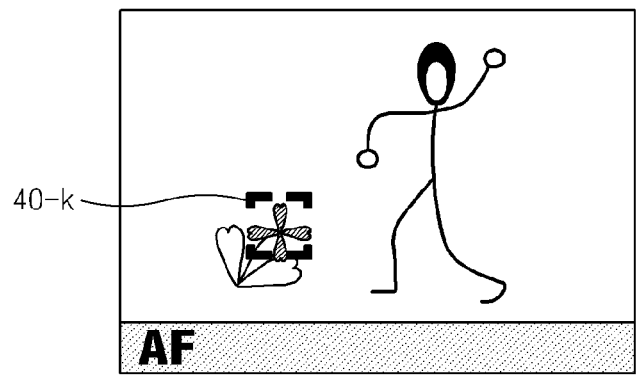

In FIG. 20B, when a flower is automatically selected as a focus area, the camera can perform AF at a position of a selected detection block, can mark an AF area 40-*k* in green, and simultaneously can display a selected position and can display that it is in a sharpest focusing state.

Figure 20C:
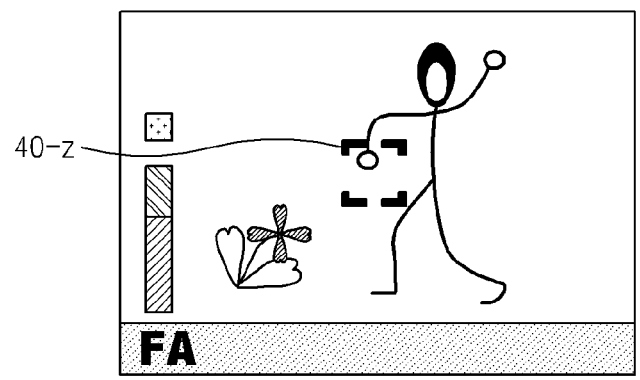
Figure 20D:
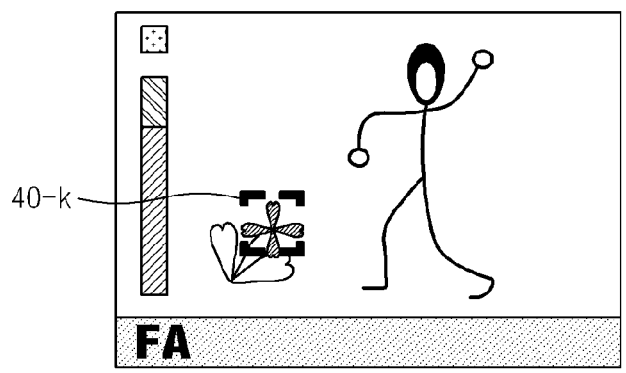

A case where the AF mode of the multi AF area mode is changed to an FA mode will now be explained. In a case where an in-focus state is not achieved in the AF mode, when the AF mode is changed the FA mode, an FA area 40-*z* can be set at a center of a screen as shown in FIG. 20C. In a case where an in-focus state is achieved in the AF mode, when the AF mode is changed to the FA mode, an AF area selected in the AF mode can be set to the FA area as shown in FIG. 20D. By using this method, when the user is not satisfied with a focus state obtained by the camera through AF, the user may finely focus the area through MF.

Figure 20E:
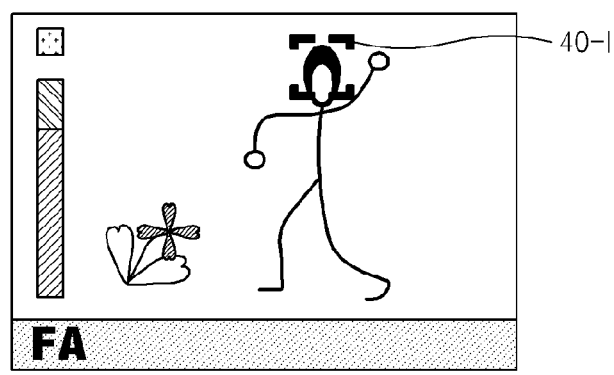

FIG. 20E illustrates that even in the multi AF area mode, when the AF mode is changed to the FA mode, the user may change the FA area. By using this method, the user may change the FA area to a desired position.

In the case where the multi AF area mode is selected, when the FA mode is changed to the AF mode, a multi AF area having 15 detection areas illustrated in FIG. 20A can be obtained. Accordingly, the FA area set by the user in the FA mode may not be stored and retained.

However, when the multi AF area mode is changed again to the selectable AF area mode, since information about a focus detection area when the mode is changed to the FA mode of the selectable AF area mode or the previous selectable AF area mode can be stored and retained, the user can return to the stored focus detection area. That is, since focus area information of only one of the selectable AF area mode and the FA mode of the selectable AF area mode is stored, the user may always return to a focus area that is previously set.

Also, in the selectable AF area mode and the FA mode, not only a position of a focus area but also a size of the focus area may be changed, and the focus area may be changed to any one of four types, that is, large, normal, small, and extra small. As for size information of the focus area, like with position information, the user may use a size that is previously set.

Figure 21A:
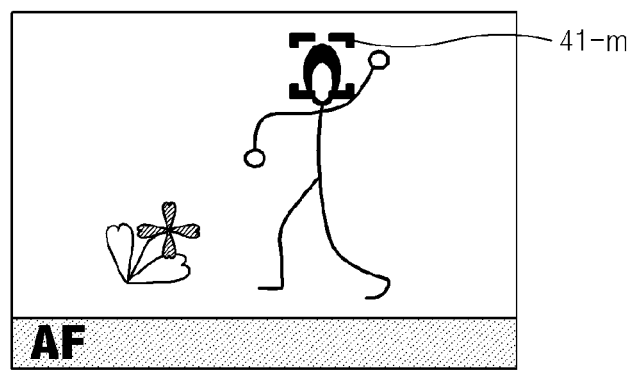
Figure 21B:
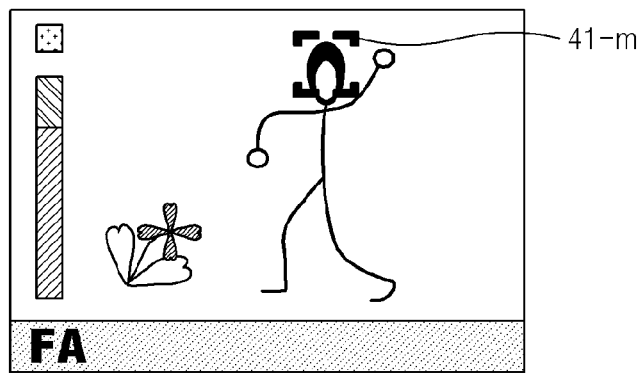
Figure 21C:
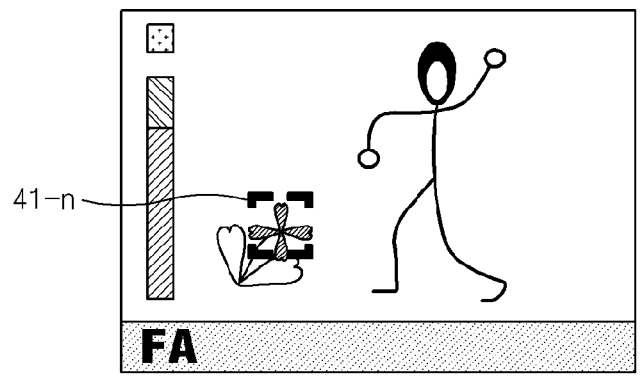
Figure 21D:
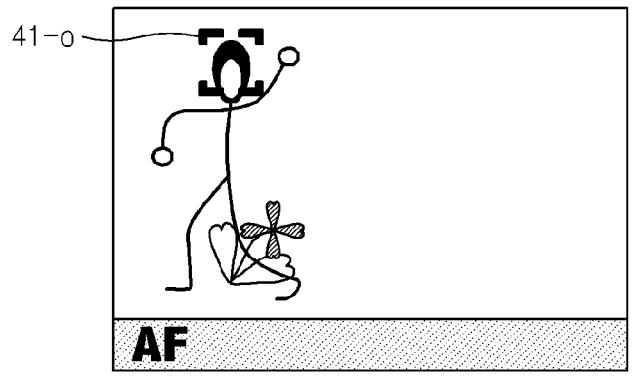

FIGS. 21A through 21D illustrate a case using a face detection AF mode. When a face 41-*m* of a subject is detected by the FD 222*a*, a face area detected as shown in FIG. 21A can be set to an AF area. When an AF mode is changed to an FA mode, an FA area can be set to the face 41-*m* as shown in FIG. 21B. In the FA mode, like with the selectable AF area mode or the multi AF area mode, a movement of the FA area may be permitted. For example, the user may move the FA area to a flower 41-*n* as shown in FIG. 21C. When the FA mode is changed again to the AF mode, a face 41-*o* obtained by detecting again a face position of the subject may be set to an AF area as shown in FIG. 21D.

Also, in the multi AF area mode and the face detection AF mode, a position of a focus area can be a position that is automatically set by the camera according to subject conditions. A position changed during the FA mode can be stored when the FA mode ends but is not used in the AF mode. This is because the mode can be automatically set again to the multi AF area mode or the face detection AF area mode. However, the position changed during the FA mode may be stored for a next FA mode.

As a result, a storage unit for the selectable AF area mode and the selectable AF area mode and a storage unit for the FA mode of the face detection AF area mode or the multi AF area mode may be provided. Alternatively, a third storage unit for storing focus area information about a focus area in the FA mode may be further provided.

As described above, in any of the selectable AF area, multi AF area, and face detection AF area, when the AF mode is changed to the FA mode, the AF area selected in the AF mode can be set to the FA area. When a result of AF is finely adjusted, since FA is performed in the same area, manipulation performance can be improved. Also, when focus detection may not be performed due to a subject state or an in-focus area is not determined, and thus the AF mode is changed to the FA mode, a center of a screen can become the FA area. When the FA mode is changed to the AF mode, a position and a size of a focus area used in the FA mode of the selectable AF area mode may be continuously used. As such, in the selectable AF area mode, when the AF mode is changed to the FA mode, focus area information about a focus area selected by the user can be stored and retained, thereby providing a user interface in accordance with the user's intention.

Alternatively, focus area information of a position and a size of a focus area in a next FA mode may be used. A focus area selected by the user in the FA mode can be stored and retained, thereby providing a user interface in accordance with the user's intention in any FA mode.

Also, in the multi AF area mode or the face detection AF mode in which the camera determines a position of an AF area, even when a position of an FA area is changed in the FA mode, the position may not be stored. When the FA mode is changed again to the AF mode, an AF area can be detected again in the multi AF area mode or the face detection AF mode. Accordingly, in the AF mode, manipulation of the camera may be simplified.

(Camera Operations According to Embodiments)

FIGS. 22 through 33 are flowcharts for explaining an operation of the focusing apparatus, according to an embodiment. First, referring to FIG. 22, an operation A1 of a digital camera can be performed. In operation S101, when a main switch SM of the digital camera is turned on, the digital camera can operate, and manipulation of a key as a manipulation unit can be detected. A manipulation signal of a user input by using various manipulation members such as mode dials as well as the key may be detected.

In operation S102, a mode of the digital camera corresponding to the manipulation of the key can be set. For example, the mode may be set to a still image mode or a moving image mode. Embodiments may be performed in both a still image mode and a moving image mode.

In the case of an interchangeable lens digital camera, in operation S103, lens information necessary for the operation of the digital camera can be received and inputted from an interchangeable lens, and an MF driving permission command generated by manipulating a focus ring can be transmitted. For example, information necessary for controlling image quality, such as information for AF, AE, and AWB, can be inputted. The information may be parameters of a lens recorded on a lens memory in a lens control circuit. While AF/MF setting information can be inputted from the lens in the interchangeable lens digital camera, AF/MF setting information may be obtained from the manipulation of the key in a lens integrated digital camera as shown in FIG. 3. An AF mode or an MF mode of the digital camera may be set from the AF/MF setting information. While AF can be initiated by pressing a shutter release button halfway in the AF mode, MF may be initiated by manipulating the focus ring in the MF mode.

As will be described in detail later, information about whether a focus lens is located in a close area when the MF is performed may be obtained.

In operation S104, an imaging device can periodically capture images.

In operation S105, light can be measured to perform AE calculation and AWB calculation. In operation S106, it can be determined whether the focus ring is manipulated, that is, it can be determined whether manipulation for MF is performed.

If it is determined in operation S106 that manipulation for MF is performed, the method can proceed to operation S107. In operation S107, FA information can be displayed. For example, first information of a sparse part and second information of a dense part may be displayed. Not only the first information and the second information but also peak value information, proximity information, and enlargement information may be included in the FA information.

If it is determined in operation S106 that no manipulation for MF is performed, the method can proceed to operation S108.

In operation S108, a live view image can be displayed. The live view image and the FA information may be displayed substantially together.

In operation S109, it can be determined whether the main switch SM is turned off. If it is determined in operation S109 that the main switch SM is not turned off, the above operations can be repeated. If it is determined in operation S109 that the main switch SM is turned off, the method can proceed to operation S110. In operation S110, the operation of the digital camera can be stopped. The operation A1 of the digital camera can end.

Figure 23:
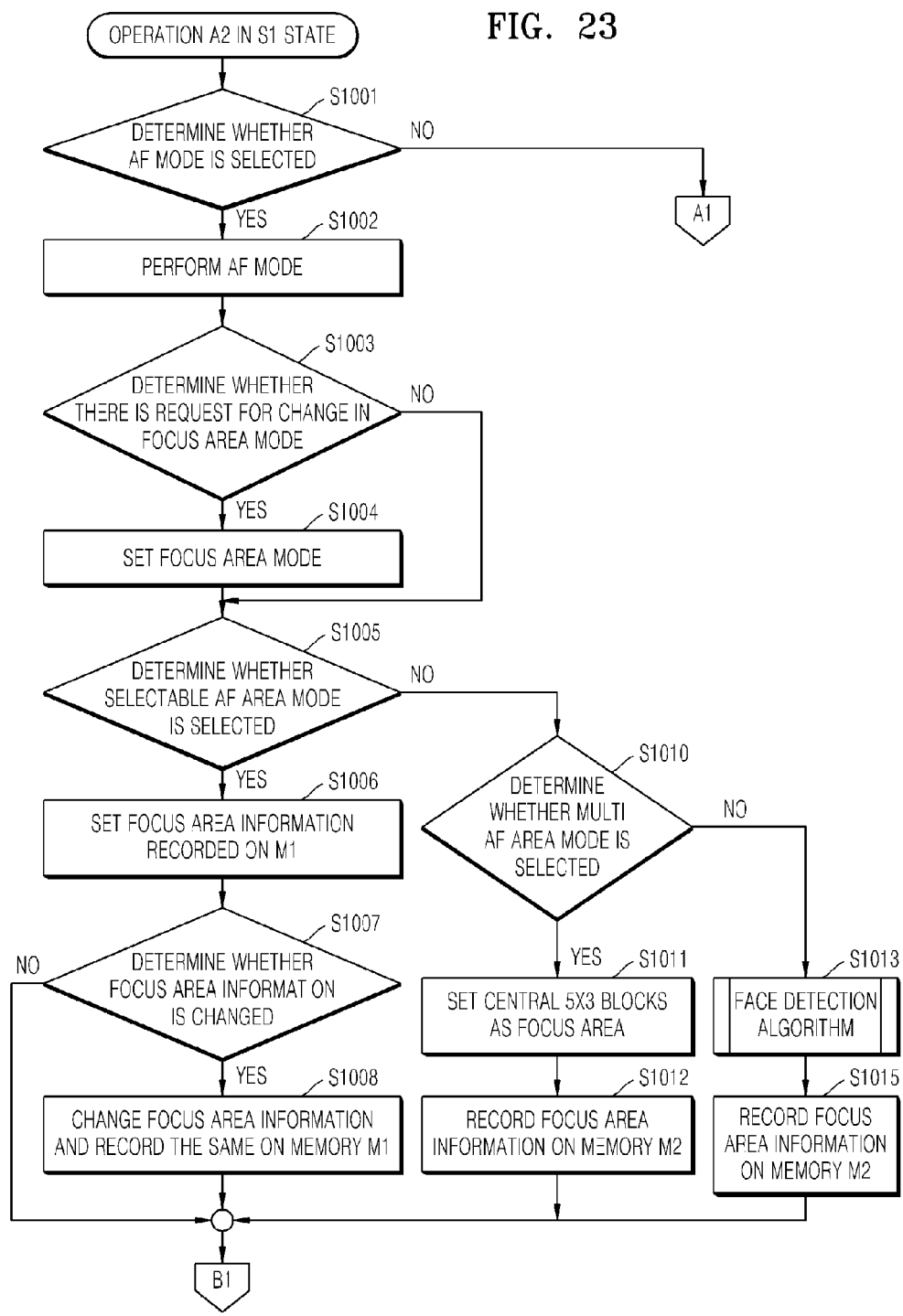

FIG. 23 is a flowchart for explaining a case where when a live view image is displayed, the shutter lease button is pressed halfway to turn on an S1 state.

Referring to FIG. 23, an operation A2 can be initiated. In operation S1001, the operation A2 can determine whether an AF mode is selected. If it is determined in operation S1001 that an MF mode (including an FA mode) is selected, the method can return to the operation A1 of FIG. 22 and can perform the MF mode (including the FA mode) by displaying a live view image. If it is determined in operation S1001 that the AF mode is selected, the method can proceed to operation S1002. In operation S1002, the AF mode can be performed. In operation S1003, it can be determined whether there is a request for a change in an AF area (focus area) mode. If it is determined in operation S1003 that there is a request for a change in an AF area mode, the method can proceed to operation S1004. In operation S1004, an AF area mode can be set by a user. The change of the AF area mode may be performed only in the AF mode. If it is determined in operation S1003 that there is no request, the AF area mode presently set can be stored and retained. In operation S1005, it can be determined whether a current selectable AF area mode is selected. If it is determined in operation S1005 that the selectable AF area mode is selected, the method can proceed to operation S1006. In operation S1006, a position and a size of the AF area can be set as values recorded on a memory M1. In operation S1007, it can be determined whether the position or size, which is focus area information, is manipulated to be changed. If it is determined in operation S1007 that the focus area information is manipulated to be changed, the method can proceed to operation S1008. In operation S1008, the position and/or the size of the AF area can be changed by the user's manipulation, and a changed position and a changed size can be recorded on the memory M1.

Meanwhile, if it is determined in operation S1005 that the selectable AF area mode is not selected, the method can proceed to operation S1010. In operation S1010, it can be determined whether a multi AF area mode is selected. As described above, the determining of whether the multi AF area mode is selected may include determining of whether a multi AF mode is selected. If it is determined in operation S1010 that the multi AF area mode is selected, the method can proceed to operation S1011. In operation S1011, 15 detection areas around a center can be set as an AF area. In operation S1012, a position and a size (such as standard size) of, for example, a central block of the 15 detection blocks can be recorded on a memory M2, which can be pre-set in order to determine one area from among 15 areas in a subsequent process.

If it is determined in operation S1010 that the multi AF area mode is not selected, since a face detection AF area mode is selected, the method can proceed to operation S1013. In operation S1013, a subroutine of a face algorithm of FIG. 33 can be processed, which will be described later in detail. In operation S1015, a position and a size of a face detection area can be recorded as a position and a size of an AF area on the memory M2. The method can proceed to operation B1 of FIG. 24.

Figure 24:
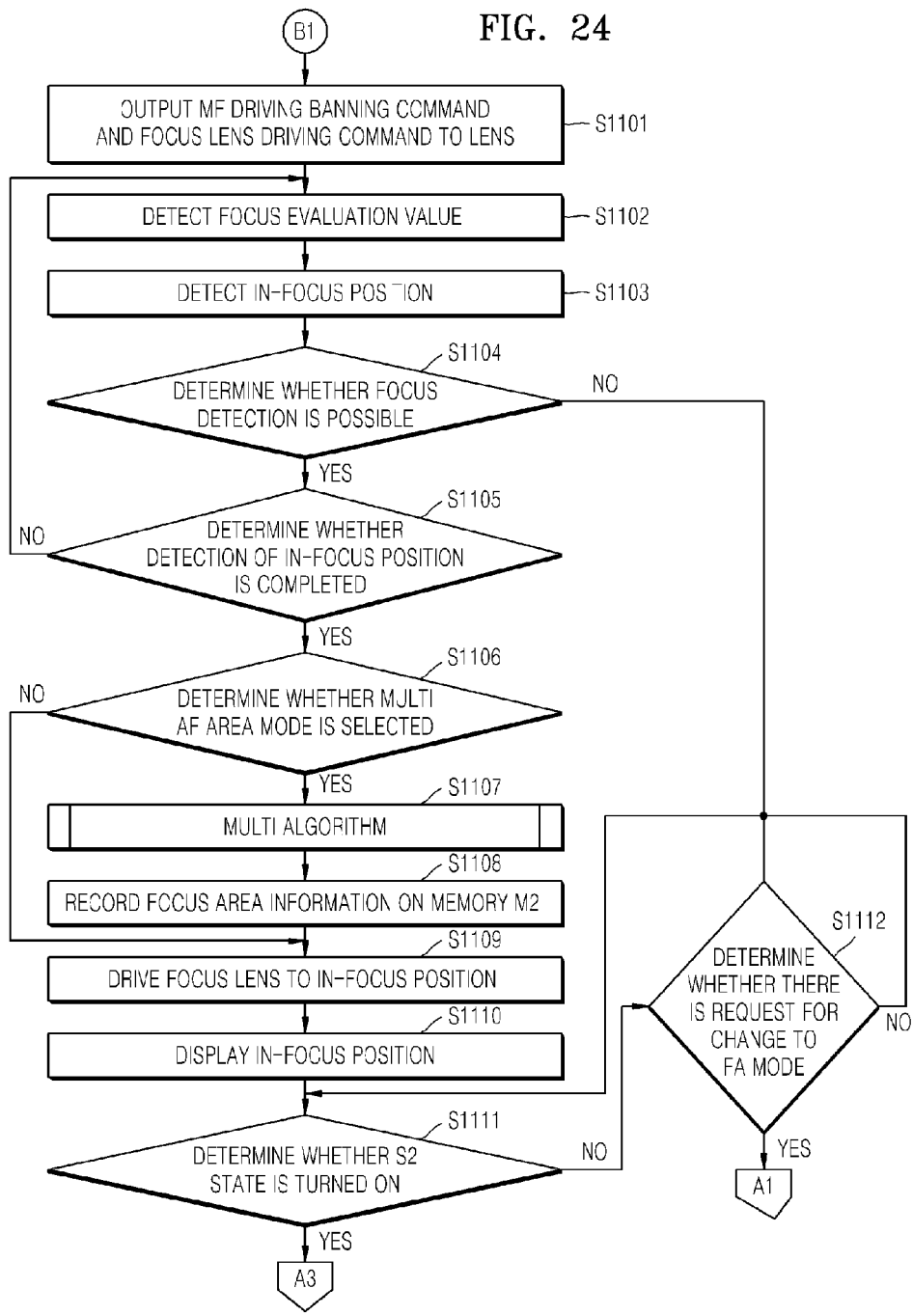

In FIG. 24, setting of the AF area can be completed. In operation S1101, an MF driving banning command of the interchangeable lens can be outputted to the lens. Because of a target AF scan requesting a contrast peak, a focus lens driving command can be outputted. In operation S1102, a focus evaluation value can be obtained from the imaging device while driving the focus lens. In operation S1103, a peak value of a contrast and a focus position corresponding to the peak value can be requested. It can be determined whether focus detection is possible in operation 1104. Since operations S1102 and S1105 are connected in a loop, a focus evaluation value and a peak value can be repeatedly requested while driving the focus lens. When a contrast of a subject is low or when brightness is low, even though an AF lens is driven, an effective peak of a focus evaluation value may not be obtained. In this case, it can be determined in operation S1104 that focus detection is impossible, and the method can proceed to operation S1111.

If it is determined in operation S1104 that focus detection is possible, the method can proceed to operation S1105. In operation S1105, it can be determined whether detection of an in-focus position is completed. When a desired peak of a focus evaluation value is detected by repeatedly requesting a focus evaluation value while driving the focus lens in the loop including operations S1102 and S1105, the method can proceed to operation S1106. In a multi AF area mode, a subroutine of a multi algorithm of FIG. 32 can be processed in operation 1107. A focus area can be determined from 15 focus detection areas by the processing.

In operation S1108, a position and a size of an area where an in-focus state can be achieved, that is, an AF area, can be recorded on the memory M2. In operation S1109, the focus lens can be driven to a requested in-focus position, and in operation S1110, the in-focus position can be displayed on a display unit.

Figure 22:
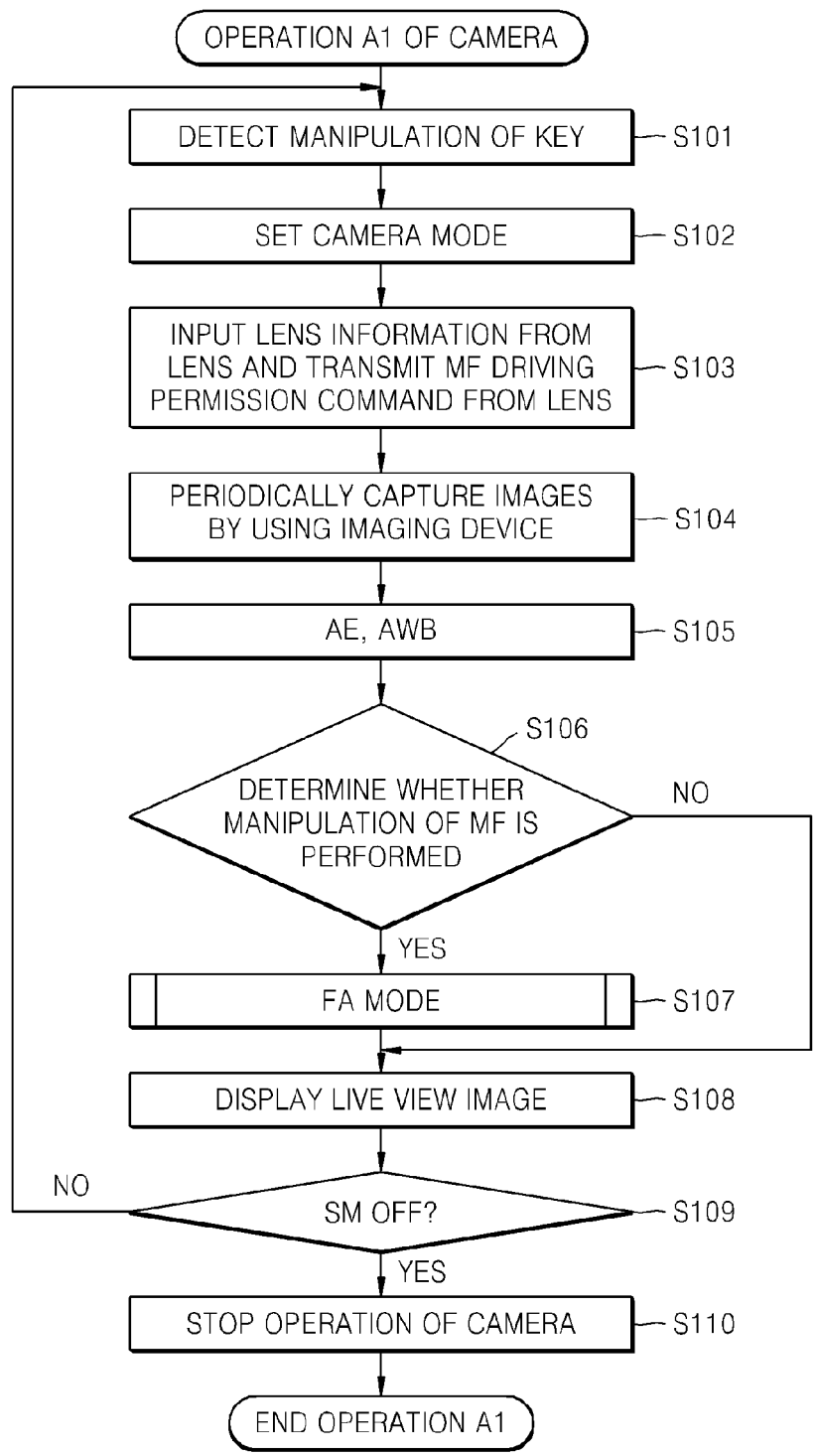
FIGS. 22 through 33 are flowcharts for explaining an operation of the focusing apparatus according to an embodiment.

In the multi AF area mode, if it is determined in operation S1104 that focus detection is impossible, the method can proceed to operation A1 of FIG. 22 or operation S1012 of FIG. 22. In operation S1012, a standard size of a center of a screen can be recorded on the memory M2.

Also, in a selectable AF area mode and a face detection AF area mode, the AF area can already be set in operations S1006, S1008, S1014, and S1015.

In operation S1111, it can be determined whether an S2 state turned on by fully pressing the shutter release button is turned on, that is, it can be determined whether there is a request for capturing an image. If it is determined in operation S1111 that the S2 state is turned on, the method can proceed to an operation A3 of FIG. 25 in which an image is captured. If it is determined in operation S1111 that the S2 state is not turned on, the method can proceed to operation S1112. In operation S1112, it can be determined whether there is a request for a change to an FA mode. The determination may be made by determining whether the AF mode is changed to an MF mode or a DMF mode by an AF/MF switch of the lens by manipulating the focus ring. If it is determined in operation S1112 that the AF mode is changed to the MF mode, that is, when the AF mode is changed to the MF mode displaying a focus evaluation value or an FA mode, the method can proceed to the operation A1 of FIG. 22. If it is determined in operation S1112 that the AF mode is not changed to the MF mode, the method can return to operation S1111 in which it is determined whether there is a request for capturing an image.

Figure 25:
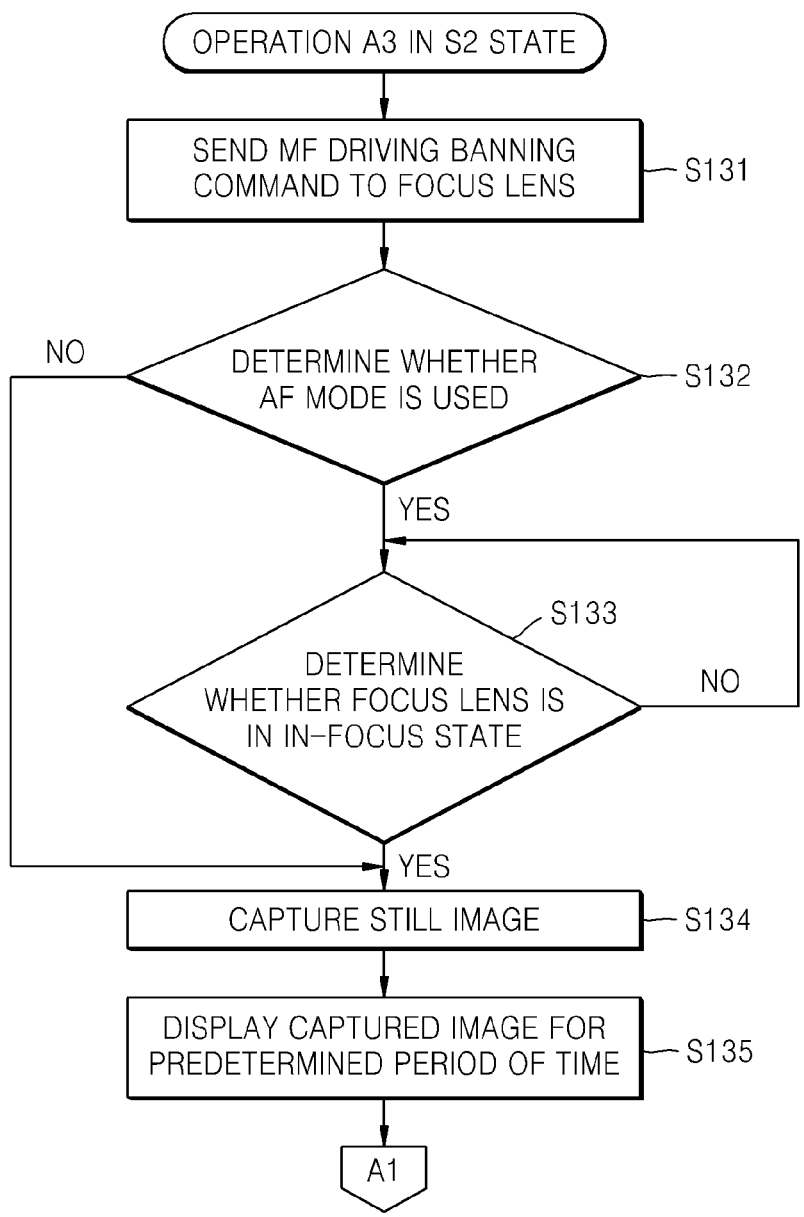

After AF is completed or when a live view is displayed in the MF mode, an operation A3 of FIG. 25 can be initiated by fully pressing the shutter release button to turn on the S2 state.

In the present embodiment, after AF is completed or when a live view image is displayed in the MF mode, the shutter release button can be fully pressed to turn on the S2 state, and the operation A3 of the digital camera can be performed.

In the S2 state, in operation S131, an MF driving banning command can be sent to the focus lens, in order to prevent a state of an image from being changed during still image exposure (capture).

In operation S132, it can be determined whether the AF mode is used. If it is determined in operation S132 that the AF mode is used, the method can proceed to operation S133. In operation S133, it is determined whether the focus lens is in an in-focus state, and when the focus lens is in an in-focus state, a still image can be captured or exposed. If it is determined in operation S132 that the MF mode, and not the AF mode, is used, the method can skip from operation S132 to operation S134. That is, in operation S134, a still image can be captured.

In operation S135, the captured still image can be displayed for a predetermined period of time. The method can return to the operation A1 of the digital camera of FIG. 22 to repeatedly display a live view image.

Figure 26:
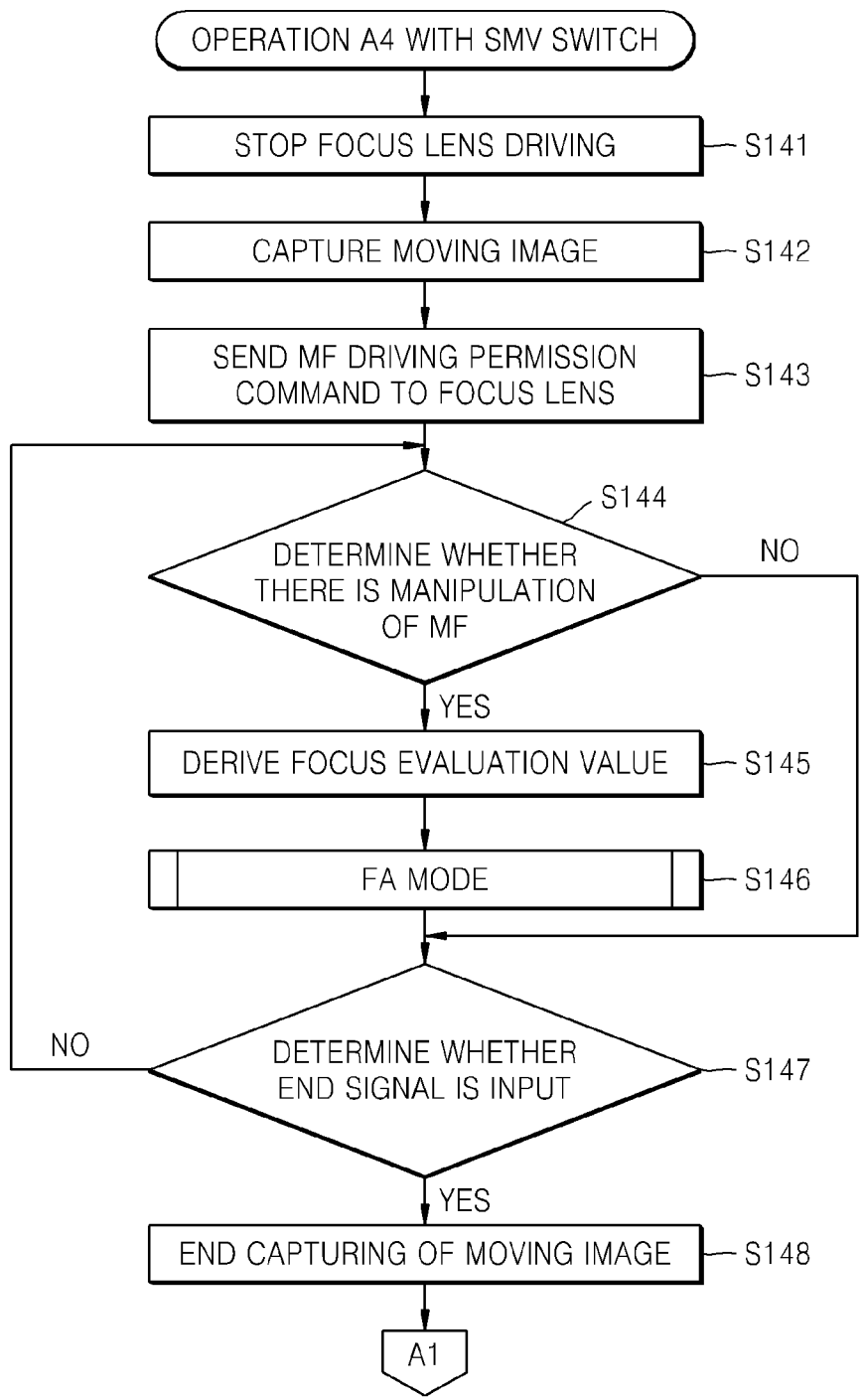

FIG. 26 is a flowchart for explaining the capturing of a moving image. Referring to FIG. 26, when an SMV switch as a moving image button is turned on, an operation A4 for capturing a moving image can be performed.

In operation S141, a focus lens driving stop command can be transmitted to the focus lens. AF driving may be stopped until capturing of a moving image is initiated. In operation S142, a moving image can be captured. In operation S143, an MF driving permission command can be sent to the focus lens. MF driving may be manipulated by the user by using a timing when a focus needs to be adjusted during moving image exposure.

In operation S144, it can be determined whether there is manipulation of MF. If it is determined in operation S144 that there is manipulation of MF, the method can proceed to operation S145. In operation S145, a focus evaluation value according to the manipulation can be derived, and the derived focus evaluation value can be calculated to separate a mantissa part and an exponent part. In operation S146, first information that can indicate the mantissa part or a linear arithmetic value of the mantissa part and second information that can indicate the exponent part or a linear arithmetic value of the exponent part can be displayed, that is, an FA display can be performed. The FA display can be the same as described above.

In operation S147, it can be determined whether a moving image shooting end signal is inputted. That is, it can be determined whether the SMV switch is turned on or off. If it is determined in operation S147 that the SMV switch is turned off, the method can proceed to operation S148. In operation S148, the capturing of the moving image can end. If it is determined in operation S147 that the SMV switch is turned on, the method can return to operation S144 in which it can be determined whether there is manipulation of MF. If it is determined in operation S144 that manipulation of MF is not detected, the method can proceed to operation S147 in which it can be determined whether a moving image shooting end signal is inputted.

Although not described in the present embodiment, a live view image may be repeatedly displayed by performing AE and AWB when a moving image is captured.

Figure 27:
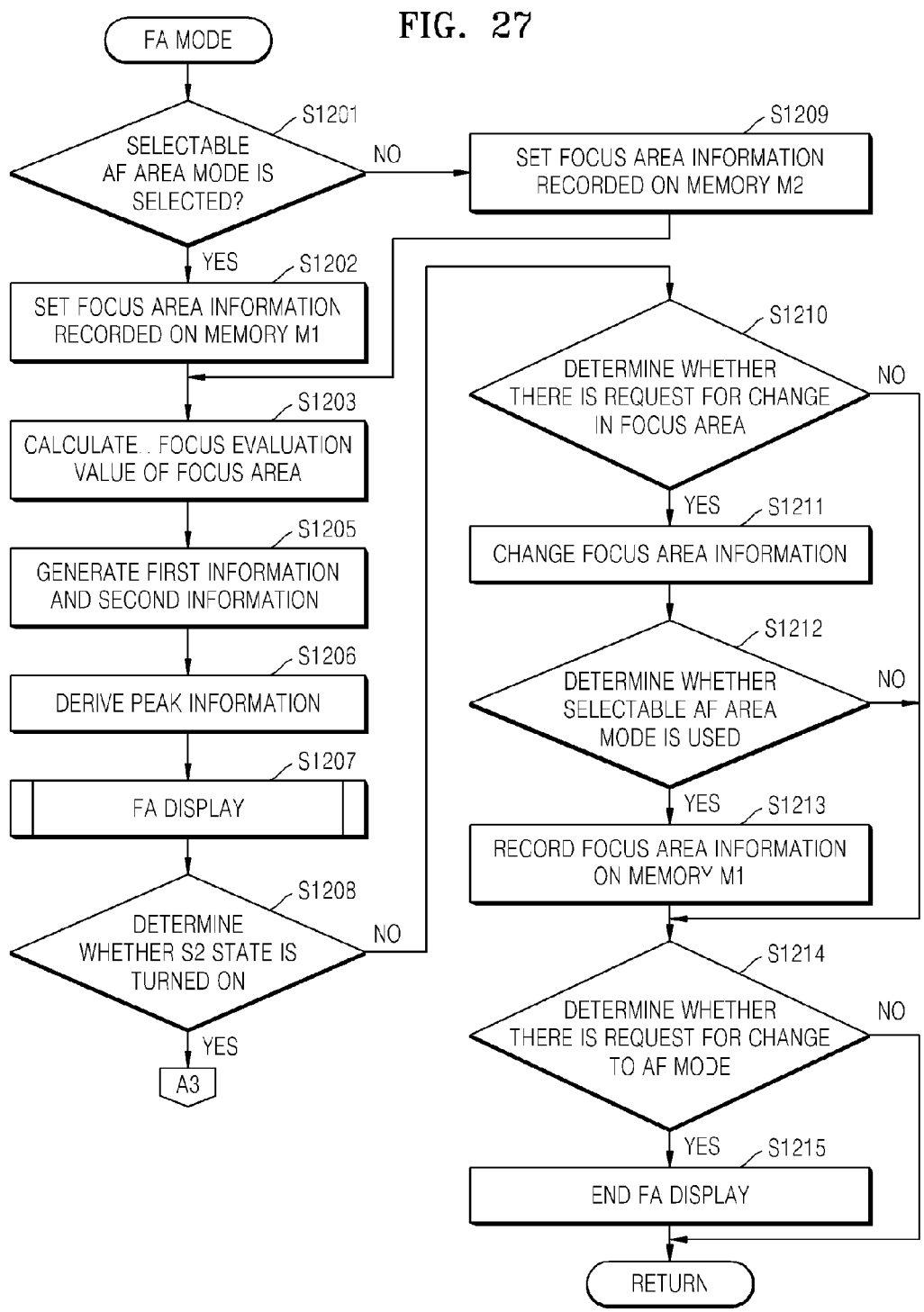

An FA mode is now explained with reference to FIG. 27. In operation S1201, it can be determined whether a selectable AF area mode is selected. If it is determined in operation S1201 that the selectable AF area mode is used, the method can proceed to operation S1202. In operation S1202, a position and a size recorded on the memory M1 can be set as a position and a size of an FA area. The memory M1 can store a position and a size of an AF area set by the user in the AF mode in operation S1008 of FIG. 23. Accordingly, if it is determined in operation S1112 of FIG. 24 that the AF mode is changed to the FA mode, the AF area set in the AF mode can be set as an FA area.

If it is determined in operation S1201 that the selectable AF area mode is not selected, since a multi AF area mode or a face detection AF area mode is selected, a position and a size of the AF area during the AF mode can be recorded on the memory M2. Accordingly, the position and the size of the AF area stored in the memory M2 can be set as an FA area. Accordingly, the AF area during the AF mode can be set as an FA area of the FA mode. In the multi AF area mode, since a focus detection area selected by using a multi algorithm from 15 focus detection areas can be recorded on the memory M2 in operation S1108 of FIG. 24, the AF area used in the AF modes can become an FA area.

In operation S1203, a focus evaluation value of the FA area can be calculated by driving the imaging device. In operation S1205, first information that can indicate a mantissa part or a linear arithmetic value of the mantissa part and second information that can indicate an exponent part or a linear arithmetic value of the exponent part can be derived. In operation S1206, peak information can be derived. In operation S1207, a subroutine of an FA display can be processed. The FA display is explained with reference to FIG. 29.

In operation S1208, it can be determined whether the shutter release button is fully pressed to turn on the S2 state. If it is determined in operation S1208 that the S2 state is turned on, the method can proceed to the operation A3 of FIG. 25. If it is determined in operation S1208 that the S2 state is not turned on, the method can proceed to operation S1210. In operation S1210, it can be determined whether there is a request for a change in a position and a size of the FA area. If it is determined in operation S1210 that there is a request for a change in a position and a size of the FA area, the method an proceed to operation S1211. In operation S1211, the position and the size of the FA area can be changed according to the user's manipulation. In operation S1212, it can be determined whether the selectable AF area mode is used, and if it is determined in operation S1212 that the selectable AF area mode is used, the method an proceed to operation S1213. In operation S1213, the changed position and the changed size of the FA area can be recorded on the memory M1.

If it is determined in operation S1210 that there is no request for a change in the FA area or if it is determined in operation S1212 that the selectable AF area mode is not used, the method can proceed to operation S1214. In operation S1214, it can be determined whether there is a request for a change to the AF mode. The determination may be made in such a manner that when a switch of the lens is changed to AF, when manipulation of the focus ring by the user is stopped in the DMF mode, or when the shutter release button is pressed halfway to turn off the S1 state and then the S1 state is turned on, it can be determined that there is a request for a change to the AF mode. If it is determined in operation S1214 that there is a request for a change to the AF mode, the method can proceed to operation S1215. In operation S1215, the FA display can be turned off, and the AF mode can be performed. If it is determined in operation S1214 that there is no request for a change to the AF mode, the method can skip operation S1215 and can return to a previous state, step, or operation before the start of the depicted operations.

Also, if it is determined in operation S1214 that the FA mode is changed to the AF mode, the position and the size of the AF area recorded on the memory M1 may be set to an AF area. Accordingly, the user may perform AF on a subject on which FA has been performed. In the selectable AF area mode, during AF and during FA, information about the changed focus area, for example, the position and the size of the focus area, can be stored and retained.

Meanwhile, in the multi AF area mode or the face detection AF area mode, if it is determined in operation S1214 that the FA mode is changed to the AF mode, the AF area may be set by using a face detection algorithm or a multi algorithm, without being affected by the position and the size of the FA area.

Figure 28:
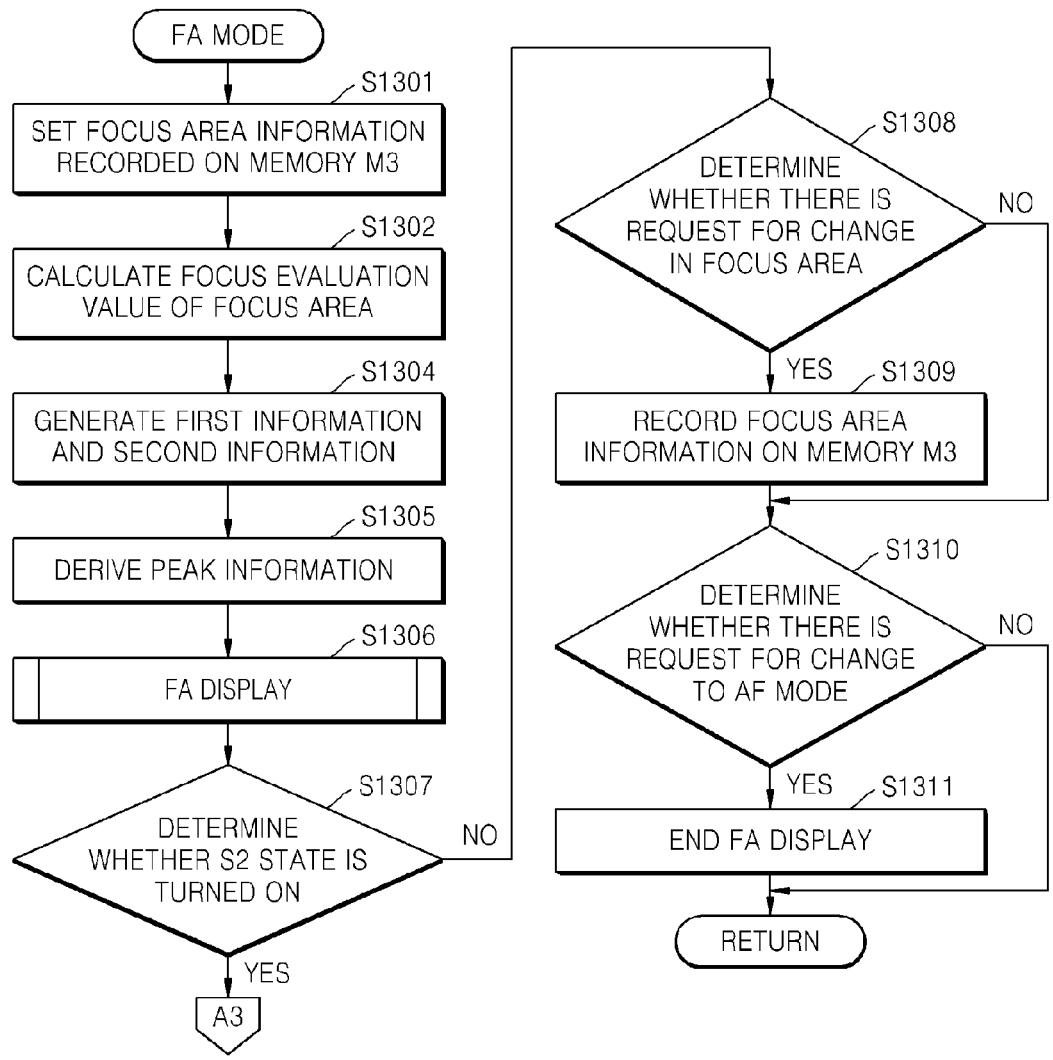

Also, another embodiment will be explained with reference to FIG. 28. Since the embodiment of FIG. 28 has almost the same configuration as the embodiment of FIG. 27, the following explanation will be made by focusing on a difference. In the embodiment of FIG. 28, since processing in an FA mode is not changed in any AF mode, determination of whether a selectable AF area mode is selected as shown in FIG. 27 may not be necessary. A great difference is that information of a position and a size of an FA area can be independent. The position and the size of the FA area can be recorded on a memory M3.

In operation S1301, information about a position and a size of the FA area can be obtained from the memory M3 and can be set as an initial condition. The following operations S1302 to S1308 can be the same as those in FIG. 27. If it is determined in operation S1308 that there is a request for a change in the FA area, the method can proceed to operation S1309. In operation S1309, the information about the position and the size of the FA area can be changed and then can be recorded on the memory M3. The recorded information can be retained even when the main switch of the camera is turned off. When a next FA mode is performed, even though an AF mode is changed to an FA mode, information of the memory M3 in operation S1301 can be used. That is, information set in the FA mode may be used only in the FA mode. Here, since information of the memory M1 is used in a selectable AF area mode, information set in the selection AF area mode may be used in any selection AF area mode.

Figure 29:
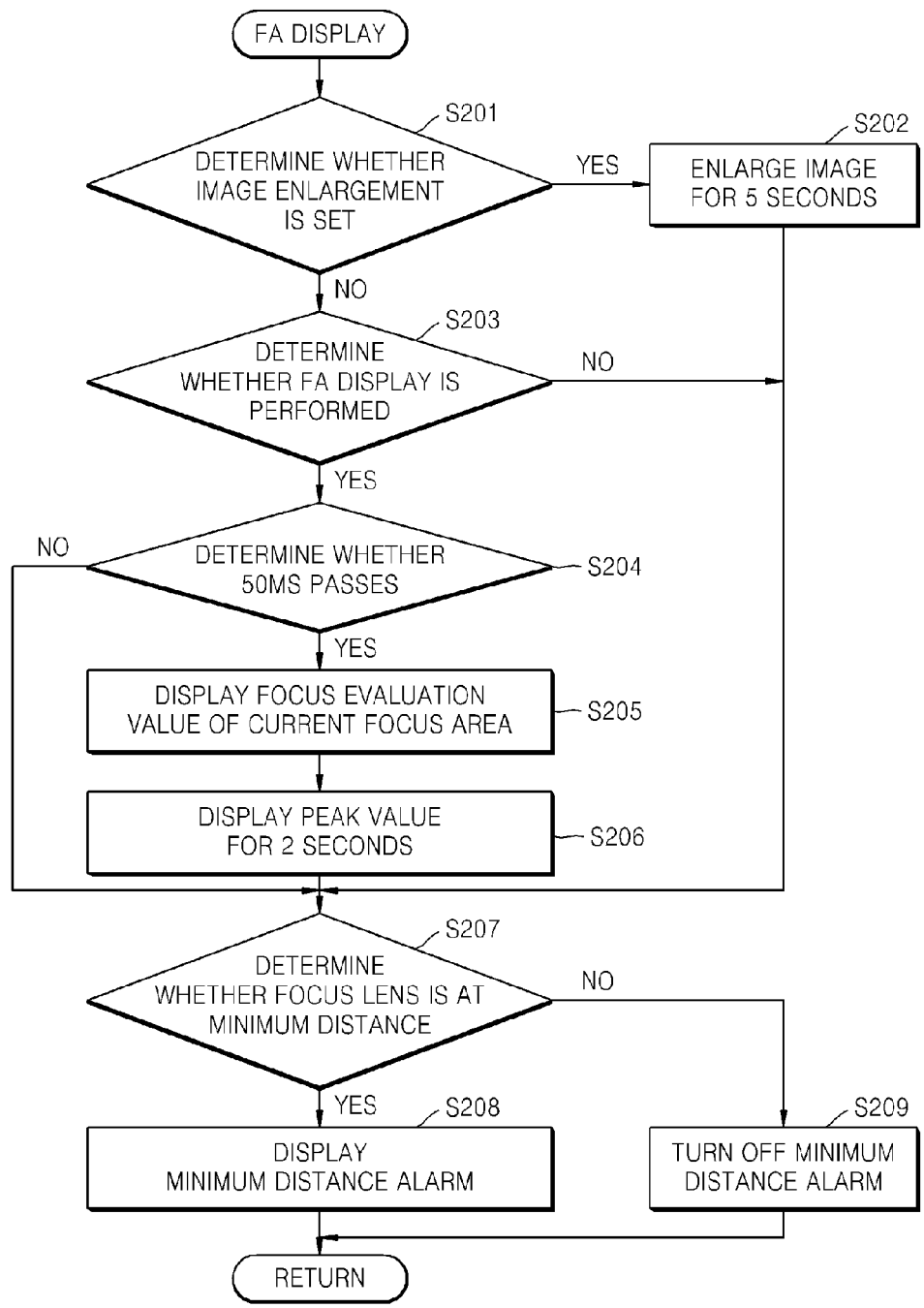

FIG. 29 illustrates an FA display according to an embodiment. When a subroutine of an FA display is called, in operation S201, it can be determined whether image enlargement is set. Setting information about whether an image is enlarged and displayed during MF can be obtained from MENU405 when the camera mode is set in operation S102 of FIG. 22. In the present embodiment, when an image is enlarged, an FA display may not be performed, and when an image is not enlarged, an FA display can be performed. However, embodiments are not limited thereto, and an FA display may be performed irrespective of whether an image is enlarged and displayed according to a device.

If it is determined in operation S201 that image enlargement is set, the method can proceed to operation S202. In operation S202, an image can be enlarged for 5 seconds, as an example. A main subject area set during AF can be enlarged. However, in an MF mode, a center of a screen may be enlarged. The enlargement can be reset, for example, every 5 seconds. That is, if manipulation of MF is continued, the enlargement can be continued, and if 5 second passes after manipulation of MF is not performed, the enlargement can end. The FA display may not be performed, and the method can skip to operation S207. If it is determined in operation S201 that image enlargement is not set, the method can proceed to operation S203.

In operation S203, it can be determined whether the FA display is performed. The determination may be made from setting information for performing an FA display during MF set by MENU405 when the camera mode is set in operation S102 of FIG. 22. If it is determined in operation S203 that the FA display is performed, the method can proceed to operation S204, and if it is determined in operation S203 that the FA display is not performed, the method can skip to operation S207 and the FA display may not be performed.

In operation S204, it can be determined whether, for example, 50 ms has passed. If it is determined in operation S204 that 50 ms has passed, the method can proceed to operation S205. If it is determined in operation S204 that 50 ms has not passed, the method can skip to operation S207 and may not update the FA display. This can prevent a display from being often changed, perform stable display, and easily manipulate the focus ring.

In operation S205, FA information about a focus evaluation value of a current focus detection area can be displayed as a bar image. As the information, focus area information stored in a memory for an FA mode can be used. In operation S206, a peak value of the focus evaluation value displayed as a bar image can be displayed for 2 seconds, as an example, which is called a peak hold. Accordingly, highest focus value information during MF may be easily checked.

Next, in operation S207, it can be determined whether the focus lens is at a minimum distance during manipulation of the focus ring. Minimum distance information may be transmitted to a camera body from a lens unit in operation S911 of an operation D1 of FIG. 31. If it is determined in operation S207 that the focus lens is at a minimum distance, the method can proceed to operation S208. In operation S208, a minimum distance alarm can be displayed, and the method can return to a previous state, step, or operation before the start of the depicted operations. If it is determined in operation S207 that the focus lens is not at a minimum distance, the method can proceed to operation S209. In operation S209, the minimum distance alarm may not be turned on, and the method can return to a previous state, step, or operation before the start of the depicted operations.

The minimum distance alarm may be displayed by flickering an entire bar image, displaying a separate icon, or displaying text.

Figure 30:
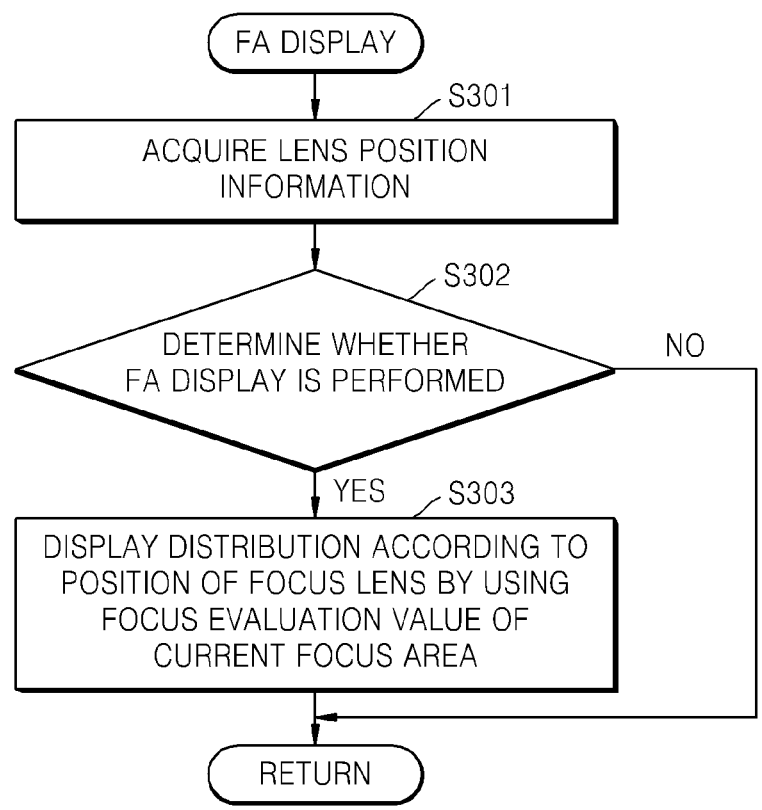

FIG. 30 illustrates an FA display according to another embodiment. In operation S301, current position information of the focus lens can be inputted. In operation S302, it can be determined whether an FA display is performed, which may be set by MENU in advance. If it is determined in operation S302 that the FA display is not set, the method can return to a previous state, step, or operation before the start of the depicted operations. If it is determined in operation S302 that the FA display is set, the method can proceed to operation S303. In operation S303, by using a focus evaluation value of a current focus detection area, a distribution of the focus evaluation value according to a position of the focus lens may be displayed as, for example, a bar image. When the focus lens is driven forward to display FA information and then is driven backward again during manipulation of MF, a current position from among already displayed FA information can be further displayed to confirm current FA information, which is the same as that described in FIG. 13. Then, the method can return to a previous state, step, or operation before the start of the depicted operations.

Figure 31:
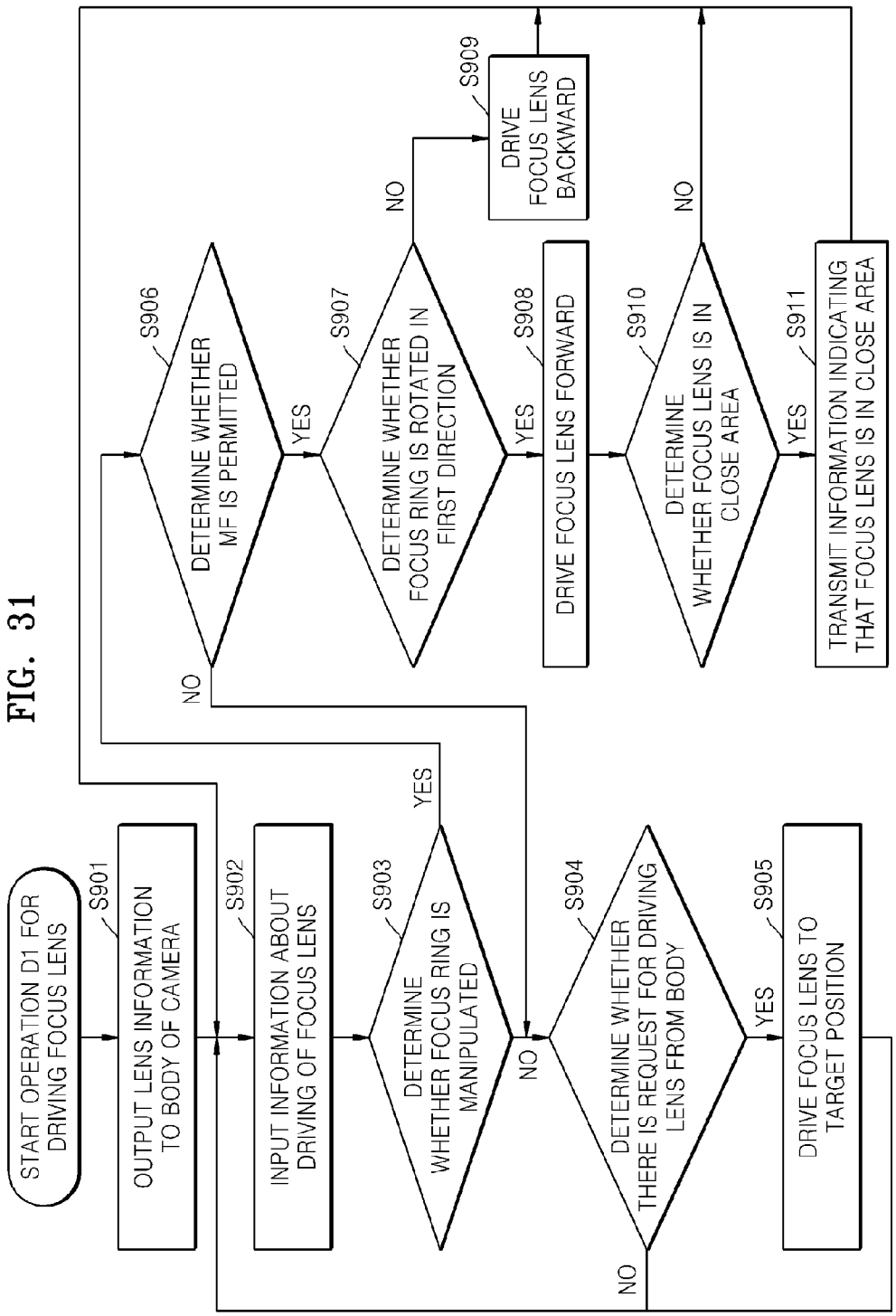

FIG. 31 is a flowchart for explaining an operation of an interchangeable lens of a digital camera. Referring to FIG. 31, the interchangeable lens can start operating from a body of the digital camera. In operation S901, lens information can be outputted to the body of the digital camera from the interchangeable lens. The lens information, which is necessary for controlling image quality, AF, AE, and AWB, can be necessary when the body of the digital camera uses the interchangeable lens.

In operation S902, information about driving of the focus lens can be inputted. For example, MF permission or non-permission command or driving information of the focus lens for AF may be included.

In operation S903, it can be determined whether the focus ring is manipulated. If the focus ring is manipulated, a pulse signal can be generated. Whether the focus ring is manipulated may be determined by determining whether the pulse signal is generated.

If it is determined in operation S903 that the focus ring is manipulated, the method can proceed to operation S906. In operation S906, it can be determined whether MF is permitted from the body of the digital camera.

If it is determined in operation S906 that MF is permitted, the method can proceed to operation S907. In operation S907, a rotation direction of the focus ring can be determined, that is, it can be determined whether the focus ring is rotated in a first direction. For example, it may be determined that the focus ring is being rotated rightwards. If it is determined in operation S907 that the focus ring is rotated in the first direction, e.g., rightwards, the method can proceed to operation S908. In operation S908, the focus lens can be driven forward. If it is determined in operation S907 that the focus ring is rotated in a second direction, e.g., leftwards, the method can proceed to operation S909. In operation S909, the focus lens can be driven backward.

In operation S910, it can be determined whether the focus lens is in a close area. If it is determined in operation S910 that the focus lens is in a close area, the method can proceed to operation S911. In operation S911, information indicating that the focus lens is in the close area can be transmitted to the body of the digital camera. The method can return to operation S902.

If it is determined in operation S906 that MF is not permitted, or if it is determined in operation S903 that manipulation of the focus ring is not detected, the method can proceed to operation S904. In operation S904, it can be determined whether there is a request for driving the lens for AF from the digital camera.

If it is determined in operation S904 that there is a request for driving the focus lens, the method can proceed to operation S905. In operation S905, the focus lens can be driven to a target position. If it is determined in operation S904 that there is no request for driving the focus lens, the method can return to operation S902. Driving of the focus lens can include search driving for contrast AF and in-focus driving in a focus detection position. The focus lens may be driven to the target position due to these drivings.

The driving of the focus lens may forcedly end when power is not supplied from the camera or the focus lens is separated from the camera.

Figure 32:
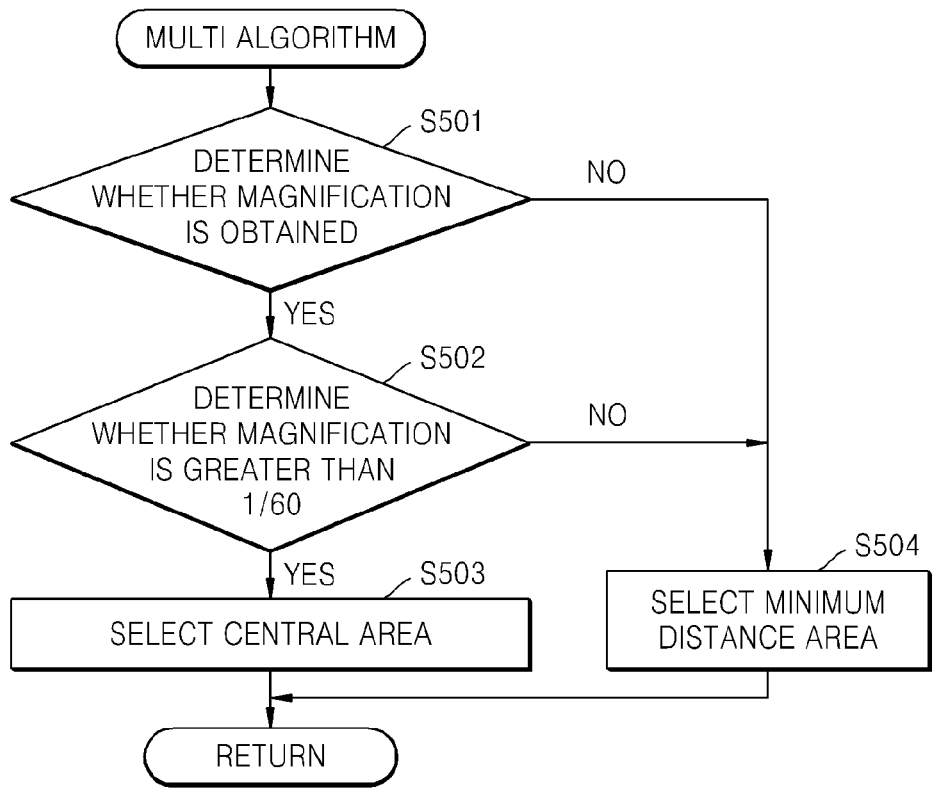

A multi algorithm is explained in more detail with reference to FIG. 32. Referring to FIG. 32, in operation S501, it can be determined whether a magnification of a central area of a captured image is obtained. If it is determined in operation S501 that the magnification is obtained, the method can proceed to operation S502. In operation S502, it can be determined whether the magnification is equal to or greater than, for example, $\frac{1}{60}$. If it is determined in operation S502 that the magnification is equal to or greater than $\frac{1}{60}$, the method can proceed to operation S503. In operation S503, the central area can be selected as a focus area. If it is determined in operation S502 that the magnification is equal to or less than $\frac{1}{60}$, the method can proceed to operation S504. In operation S504, a minimum distance area can be selected as a focus area.

Figure 33:
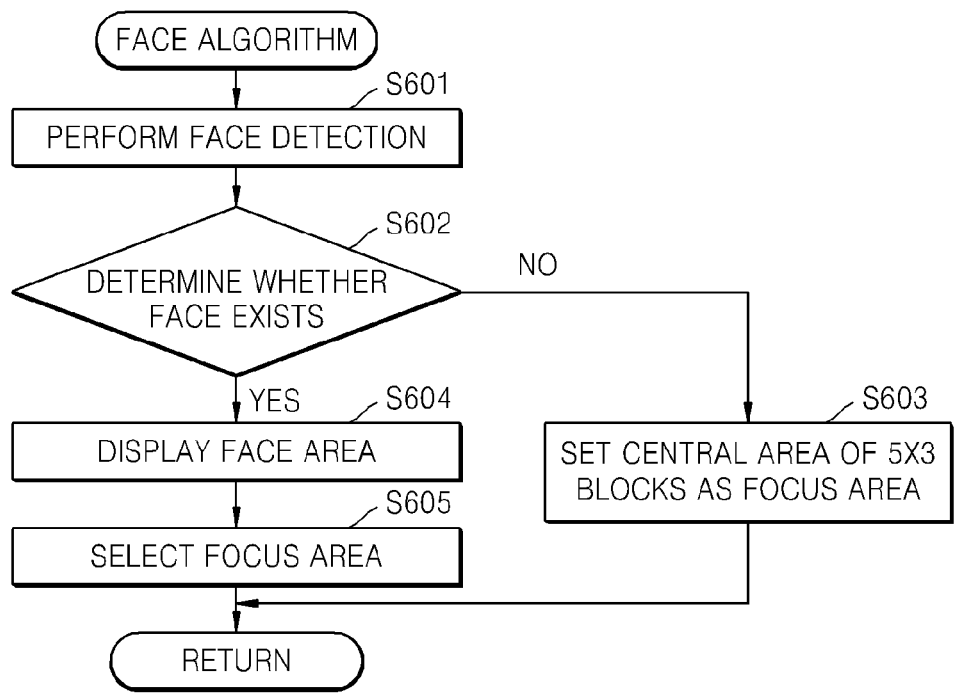

A face detection algorithm is explained in more detail with reference to FIG. 33. Referring to FIG. 33, in operation S601, face detection can be performed. Recent information for face detection may be obtained because face information can always be detected according to image information inputted by a subject detection unit of the signal processor 221 (see FIG. 5). Of course, previous face information may be used. A plurality of faces may also be detected.

In operation S602, it can be determined whether a face exists. If it is determined in operation S602 that no face exists, the method can proceed to operation S603. In operation S603, a central area of, for example, 5×3 blocks can be set as an AF area. If it is determined in operation S602 that a face exists, the method can proceed to operation S604. In operation S604, a face area can be displayed. An inner range of the detected face may be displayed.

In operation S605, an area including at least a part of the face area may be selected as a focus area. If a plurality of faces are detected, a face having a largest size may be selected in order to focus a face close to the digital camera.

The aforesaid focusing method may be embodied as computer-readable code which may be read by a computer-readable medium. The computer-readable recording medium includes any type of recording device in which computer-readable data is stored.

Examples of the computer-readable recording medium include a flash memory.

The device described herein may comprise a processor, a memory for storing program data to be executed by the processor, a permanent storage such as a disk drive, a communications port for handling communications with external devices, and user interface devices, including a display, keys, etc.

When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor. Also, using the disclosure herein, programmers of ordinary skill in the art to which the invention pertains can easily implement functional programs, codes, and code segments for making and using the invention.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing particular embodiments and is not intended to be limiting of exemplary embodiments of the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention. In addition, it should be understood that although the terms "first," "second," etc. may be used herein to describe various elements, these elements should not be limited by these terms, which are only used to distinguish one element from another.

As described above, since focus area information about a focus area is stored when a focusing mode is changed, a focus area can be easily set from the stored focus area information in a changed focusing mode. Accordingly, manipulation for focusing may be simplified and a focusing speed may be improved.

While the invention has been particularly shown and described with reference to exemplary embodiments thereof, it will be understood by those of ordinary skill in the art that various changes in form and details may be made therein without departing from the spirit and scope of the present invention as defined by the following claims. Therefore, the scope of the invention is defined not by the detailed description of the invention but by the following claims, and all differences within the scope will be construed as being included in the invention.

What is claimed is:

1. A focusing apparatus comprising:
a focus lens;
an imaging device that captures image light passing through the focus lens and generates an image signal;
a focus evaluation value calculator that receives the image signal as input from the imaging device and calculates a focus evaluation value of the received image light;
a manipulation unit that, generates a user input signal to thereby select one of focusing modes;
a focus area setting unit that sets a focus area in a received image based on the selected focusing mode, wherein the focus area is automatically determined in a first focusing mode, and the focus area may either be determined based on user input or may be set based on previously stored information in a second focusing mode;
an auto focusing control unit that, when the first focusing mode is selected, performs focusing by automatically adjusting a position of the focus lens according to a first focus evaluation value that is calculated from a first focus area in a first received image;
an information deriving unit that, when the second focusing mode is selected, derives focus aid (FA) information corresponding to a second focus evaluation value that is calculated from a second focus area in a second received image in response to user input resulting from the user manually adjusting the position of the focus lens;
a display unit that, when the second focusing mode is selected, displays the FA information; and
a storage unit that stores at least one of first focus area information about the first focus area and second focus area information about the second focus area,
wherein when the focusing mode is changed from the first focusing mode to the second focusing mode, the focus area setting unit sets the second focus area based on the first focus area, wherein the second focus area may be further changed based on user input, and
wherein when the focusing mode is changed from the second focusing mode to the first focusing mode, the focus area setting unit sets a third focus area in a third received image based on one of the first focus area information and the second focus area information stored during a previous focusing.

2. The focusing apparatus of claim 1, wherein the previous focusing is performed according to the first focusing mode.

3. The focusing apparatus of claim 2, wherein the first focusing mode comprises selectable AF area mode in which a focus area is set by a user selection.

4. The focusing apparatus of claim 1, wherein the previous focusing is performed according to the second focusing mode and the position of the focus lens is manually adjusted.

5. The focusing apparatus of claim 1, wherein the focus area setting unit sets a 1-1 focus area according to a user's selection, and
wherein the storage unit stores 1-1 focus area information about the 1-1 focus area.

6. The focusing apparatus of claim 5, wherein the focus area setting unit sets the third focus area in the third captured area according to the first focus area information during the previous focusing.

7. The focusing apparatus of claim 5, wherein the storage unit retains the stored first focus area information even when a power switch of the focusing apparatus is turned off.

8. The focusing apparatus of claim 1, wherein the focus area setting unit sets a 1-2 focus area by using a multi detection algorithm, and
wherein the storage unit comprises a second storage unit that stores 1-2 focus area information about the 1-2 focus area.

9. The focusing apparatus of claim 8, wherein the focus area setting unit sets a 1-3 focus area by using a face detection algorithm, and wherein the storage unit comprises a third storage unit that stores 1-3 focus area information about the 1-3 focus area.

10. The focusing apparatus of claim 9, wherein the second storage unit and the third storage unit are the same.

11. The focusing apparatus of claim 10, wherein the second storage unit and the third storage unit do not retain the stored second focus area information and a stored third focus area information when a power switch of the focusing apparatus is turned off.

12. The focusing apparatus of claim 1, wherein the focus area information comprises at least one of a position and a size of a focus area.

13. The focusing apparatus of claim 1, wherein the focus area setting unit sets the second focus area by using a user selection, and the storage unit stores the second focus area information about the second focus area.

14. The focusing apparatus of claim 1, wherein the first focus area and the second focus area are the same.

15. The focusing apparatus of claim 1, wherein the first focus area and the second focus area are different from each other.

16. The focusing apparatus of claim 1, wherein the storage unit comprises a first storage unit that stores the first focus area information, and a second storage unit that stores the second focus area information.

17. The focusing apparatus of claim 16, wherein the second storage unit retains the stored second focus area information even when a power switch of the focusing apparatus is turned off.

18. The focusing apparatus of claim 1, wherein the focus area setting unit sets the third focus area in the third received image according to the first focus area information if and only if the first focus area information was stored based on a previous focusing according to the first focusing mode in which a focus area was set by a user selection.

* * * * *